United States Patent
Vlachy et al.

(10) Patent No.: US 10,167,773 B2
(45) Date of Patent: Jan. 1, 2019

(54) LOADED TURBOCHARGER TURBINE WASTEGATE CONTROL LINKAGE JOINTS

(71) Applicant: Garrett Transporation I Inc., Torrance, CA (US)

(72) Inventors: David Vlachy, Omice (CZ); Filip Tomanec, Brno (CZ)

(73) Assignee: Garrett Transportation I Inc., Torrance, CA (US)

(*) Notice: Subject to any disclaimer, the term of this patent is extended or adjusted under 35 U.S.C. 154(b) by 132 days.

(21) Appl. No.: 15/219,473

(22) Filed: Jul. 26, 2016

(65) Prior Publication Data

US 2017/0051664 A1 Feb. 23, 2017

Related U.S. Application Data

(60) Provisional application No. 62/207,430, filed on Aug. 20, 2015.

(51) Int. Cl.
F02B 37/18 (2006.01)

(52) U.S. Cl.
CPC ............ *F02B 37/186* (2013.01); *Y02T 10/144* (2013.01)

(58) Field of Classification Search
CPC ..... F02B 37/183; F02B 37/186; Y02T 10/144
See application file for complete search history.

(56) References Cited

U.S. PATENT DOCUMENTS

2013/0139502 A1* 6/2013 Chu ..................... F02B 37/186
60/602
2013/0333379 A1* 12/2013 Hinkelmann ......... F01D 17/105
60/602
2016/0053675 A1 2/2016 Mehne et al.

FOREIGN PATENT DOCUMENTS

| DE | 10 2007 018618 A1 | 10/2007 |
| DE | 10 2010 049466 A1 | 4/2012 |
| DE | 10 2013 207677 A1 | 10/2014 |
| FR | 3 013 384 A1 | 5/2015 |
| WO | 2005/008041 A1 | 1/2005 |
| WO | 2013/015985 A1 | 1/2013 |
| WO | 2013/087182 A2 | 6/2013 |
| WO | 2015/075331 A1 | 5/2015 |
| WO | 2016/031564 A1 | 3/2016 |
| WO | 2016/031565 A1 | 3/2016 |

OTHER PUBLICATIONS

Double Torsion Springs, SF-VFDR Stainless Steel, 2008 (2 pages).
Double Torsion Springs, SF-VFDR Stainless Steel, 2008 (7 pages).
EP Application No. 16 18 4412.1-1616, Extended European Search Report, dated Jan. 24, 2017 (7 pages).
Springs & Things, Inc., Torsion Springs, 2009 (4 pages).

* cited by examiner

Primary Examiner — Audrey K Bradley
(74) Attorney, Agent, or Firm — Brian J. Pangrle

(57) ABSTRACT

An assembly can include a turbine housing that includes a bore, a wastegate seat and a wastegate passage that extends to the wastegate seat; a bushing disposed at least in part in the bore; a rotatable wastegate shaft received at least in part by the bushing; a wastegate plug that extends from the wastegate shaft; a control arm operatively coupled to the wastegate shaft; a control link operatively coupled to the control arm; and a biasing element coupled to the control arm and to the control link.

20 Claims, 24 Drawing Sheets

2610

2612

2613

2614

LOADED TURBOCHARGER TURBINE WASTEGATE CONTROL LINKAGE JOINTS

RELATED APPLICATION

This application claims priority to and the benefit of a U.S. Provisional Application Ser. No. 62/207,430, filed 20 Aug. 2015 and this application incorporates by reference herein a U.S. patent application Ser. No. 14/194,909, filed 3 Mar. 2014 and incorporates by reference herein a U.S. patent application Ser. No. 14/194,913, filed 3 Mar. 2014.

TECHNICAL FIELD

Subject matter disclosed herein relates generally to turbomachinery for internal combustion engines and, in particular, to turbine wastegates.

BACKGROUND

A turbine wastegate is typically a valve (e.g., a wastegate or wastegate valve) that can be controlled to selectively allow at least some exhaust to bypass a turbine. Where an exhaust gas of an internal combustion engine drives a turbine that can drive a compressor for boosting inlet pressure to an internal combustion engine (e.g., as in a turbocharger), a wastegate provides a means to control the boost pressure (e.g., by wastegating at least a portion of the exhaust gas).

A so-called internal wastegate can be characterized as being integrated at least partially into a turbine housing. An internal wastegate typically includes a flapper valve (e.g., a plug or poppet), a crank arm, a shaft or rod, and an actuator that can be coupled to a control linkage that is coupled to the crank arm, which may be considered a part of the control linkage. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

Wastegate components for various internal combustion engine applications may be of particular concern where operational temperatures and/or exhaust pulsation levels can be considerable. For example, noise may be generated responsive to exhaust pulsation and/or other vibration associated with operation of an internal combustion engine and/or a vehicle. Various examples of wastegates and wastegate related components, as are described herein, may provide for reduction in noise, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
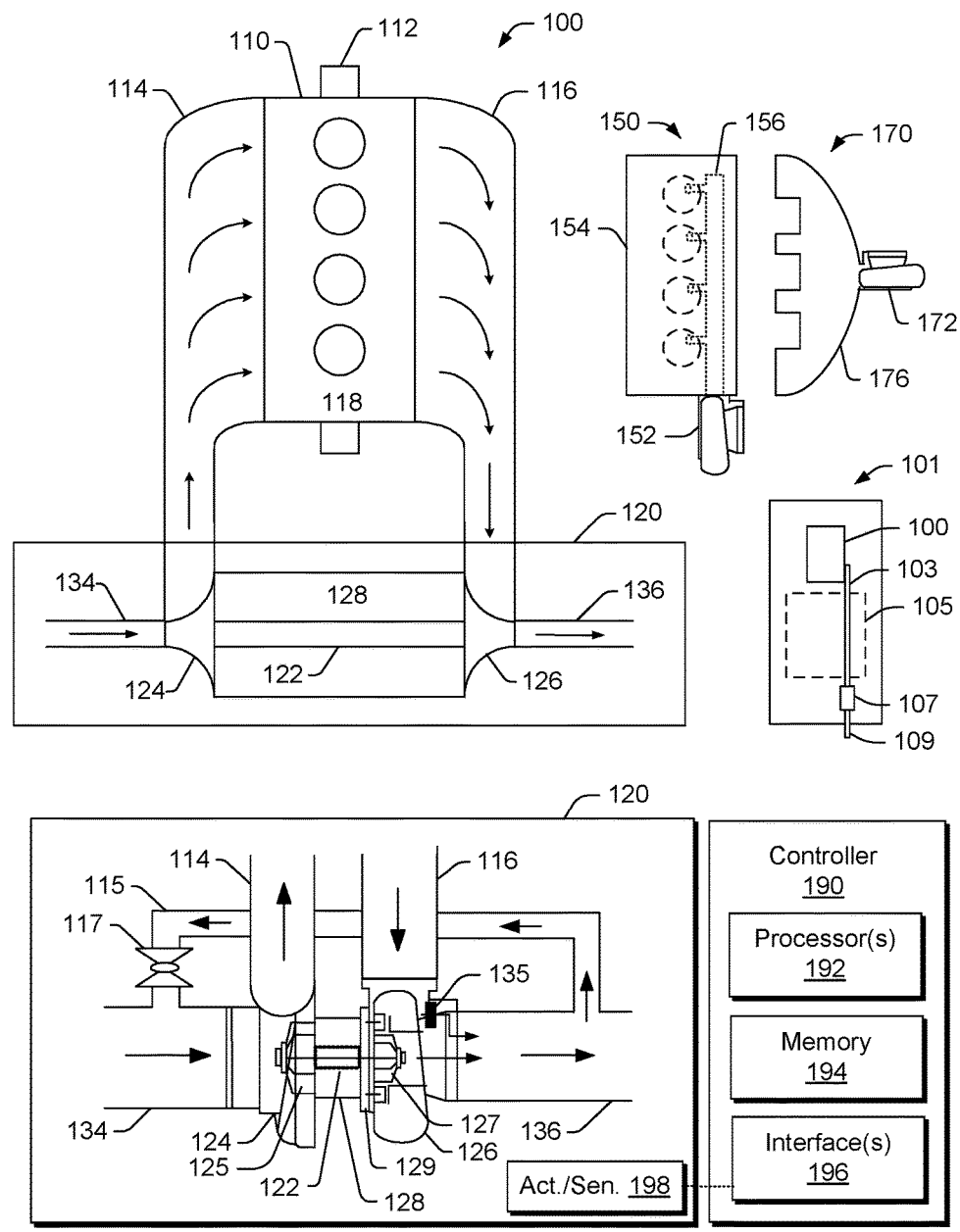
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU), engine management unit (EMU), etc. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation (e.g., optionally via turbocharger control).

The controller 190 may include circuitry for control of one or more of lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator that can respond to receipt of an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit). As an example, an actuator for a wastegate may be an electric actuator. As an example, an actuator for a wastegate may be a rotary electric actuator (REA) that includes an electric motor that can rotate a shaft to, for example, move a control linkage operatively coupled to a wastegate.

Figure 2:
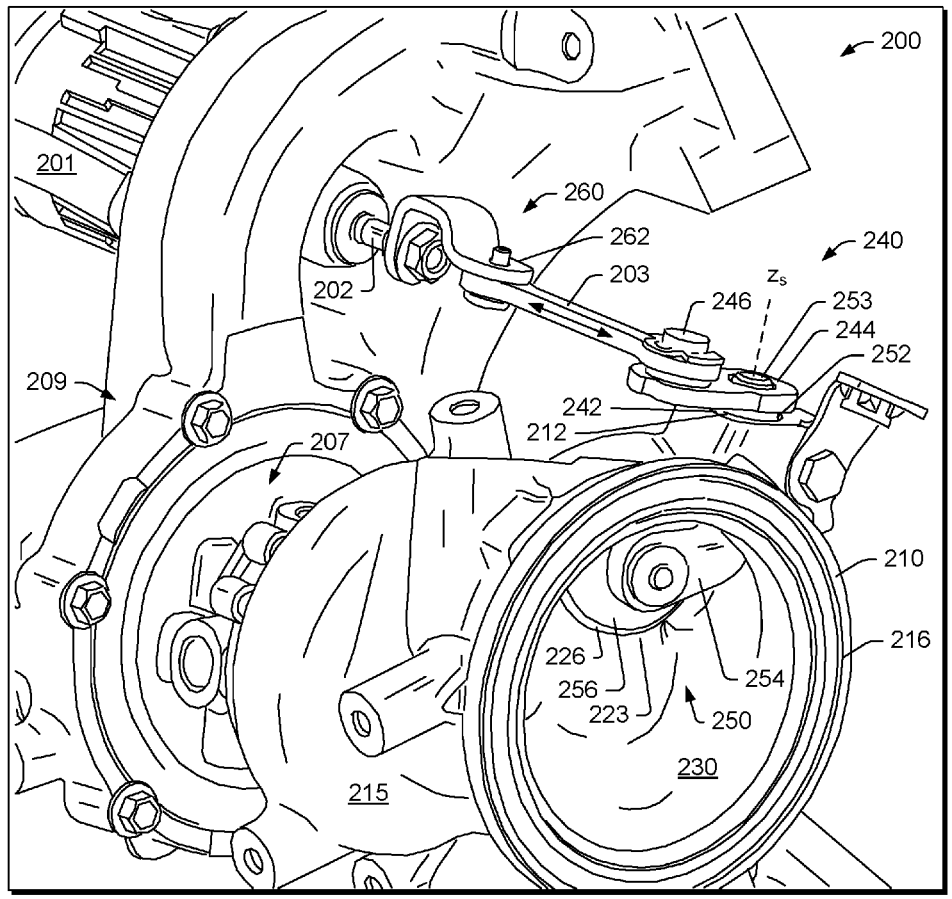
FIG. 2 is a series of view of an example of an assembly that includes a wastegate.

FIG. 2 shows an example of an assembly 200 that includes an actuator 201, an actuation rod 202, an actuator link 203 (e.g., a control link), a center housing 207 (e.g., to house a bearing, bearings, etc. for a turbocharger shaft, etc.), a compressor housing 209, a turbine housing 210 that includes a bore 212, a spiral wall 215 (e.g., that defines, in part, a volute), an exhaust gas outlet opening 216, a wastegate wall 223 that extends to a wastegate seat 226, and an exhaust chamber 230.

In the example of FIG. 2, the turbine housing 210 may be a single piece or multi-piece housing. As an example, the turbine housing 210 may be a cast component (e.g., formed via sand casting or other casting process). As shown, the turbine housing 210 includes various walls, which can define features such as the bore 212, a turbine wheel opening, the gas exhaust outlet opening 216, the chamber 230, etc. In particular, the wastegate wall 223 defines a wastegate passage in fluid communication with an inlet conduit where a portion of a wastegate control linkage 240 and a wastegate arm and plug 250 are configured for opening and closing the wastegate passage (e.g., for wastegating exhaust). Another portion of the wastegate control linkage 260 is operatively coupled to the actuator 201, for example, via a coupling 262 that couples the actuator link 203 to the actuation rod 202 (e.g., a linear or axially translating actuation rod).

In the example of FIG. 2, the portion of the wastegate control linkage 240 includes a bushing 242 that is dimensioned for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, in an effort to seal the chamber 230 from an exterior space, etc. (e.g., to reduce leakage of exhaust gas). The bore 212, the bushing 242 and the shaft 252 may each be defined by a diameter or diameters as well as one or more lengths (e.g., axial lengths).

As an example, the assembly 200 may be fitted to an exhaust gas conduit or other component of an internal combustion engine (see, e.g., examples of FIG. 1), for example, via a flange such that exhaust is received via an inlet conduit that may direct exhaust to a volute (e.g., or volutes) that may be defined at least in part by the spiral wall 215. As an example, a volute (e.g., or volutes) may direct exhaust gas (e.g., via a nozzle or nozzles) to a turbine wheel disposed in the turbine housing 210 where the exhaust gas may flow and expand in a turbine wheel space defined in part by the turbine housing 210. Exhaust gas may then exit the turbine wheel space by flowing to the chamber 230 and then out of the turbine housing 210 via the exhaust gas outlet opening 216.

As to wastegating, upon actuation of the control linkage 240 (e.g., by the actuator link 203 being operatively coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through a nozzle to a turbine wheel space. The wastegated portion of the exhaust may then exit the turbine housing 210 via the exhaust gas outlet opening 216 (e.g., and pass to an exhaust system of a vehicle, be recirculated in part, etc.).

As an example, the portion of the control linkage 240 may exert a force that acts to force the plug 256 in a direction toward the wastegate seat 226. For example, the actuator 201 may include a biasing mechanism (e.g., a spring, etc.) that exerts force, which may be controllably overcome, at least in part, for rotating the plug 256 away from the wastegate seat 226 (e.g., for wastegating). As an example, the actuator 201 may be mounted to the assembly 200. As an example, the actuator 201 may be a linear actuator, for example, for moving the actuation rod 202 along an axis. Depending on orientation of a plug, a shaft, a control linkage and such a rod, to maintain the plug in a closed position, the rod may exert a downward force (e.g., away from the control linkage as in the example of FIG. 2) or the rod may exert an upward force (e.g., toward the control linkage). For example, where the control arm 244 (e.g., and the peg 246) of the portion of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, where a rotary actuator is implemented in an assembly, rotation of a rotational peg (e.g., shaft, pin, etc.) may be in a clockwise or in a counter-clockwise direction to cause a plug of a wastegate to open or close or close or open with respect to a wastegate seat (e.g., depending on orientation of components).

As an example, the actuation rod 202 of the actuator 201 may be biased to exert a force on the portion of the control linkage 240 that causes the portion of the control linkage 240 to exert a force on the plug 256 such that the plug 256 seats against the wastegate seat 226. In such an example, the actuator 201 may at least in part overcome the force that biases the actuation rod 202 such that the shaft 252 rotates the plug 256 away from the wastegate seat. For example, in FIG. 2, to initiate wastegating, the entire plug 256 rotates about an axis of the shaft 252 and moves away from the wastegate seat 226 (e.g., without any portion of the plug 256 moving in a direction into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the portion of the control linkage 240 (e.g., the pressure differential acts to bias the plug 256 toward an open position). Accordingly, the closing force applied to the plug 256 should overcome pressure force from below the plug 256. Further, where the shaft 252 may include some play (e.g., axial play, etc.), the closing force applied to the plug 256 may cause the plug 256 to move with respect to the wastegate seat 226.

In the example of FIG. 2, the axes of the bore 212, the bushing 242 and the shaft 252 may be aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it may be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

In the example of FIG. 2, the actuator 201 is mounted at a distance from the turbine housing 210, which can, for example, reduce actuator exposure to heat energy of exhaust gas that flows to and through the turbine housing 210. However, as shown, the control arm 244 attached to the shaft 252 and therefore may be heated at least in part via conduction of heat energy from the shaft 252 where at least a portion of the shaft 252 is exposed directly to exhaust gas (e.g., in the chamber 230, in the bore 212, etc.). Further, a conduction path for heat energy may exist from the plug 256 via the arm 254 to the shaft 252. In the example of FIG. 2, during operation of the assembly 200, the portion of the control linkage 240 can be exposed to heat energy that is greater than the level of heat energy to which the actuator 201 may be exposed and greater than the level of heat energy to which the portion of the control linkage 260 is exposed. In such an example, issues as to thermal expansion/contraction, wear, noise, etc., may be more prominent at the portion of the control linkage 240 (e.g., a "hot" portion) when compared to the portion of the control linkage 260 (e.g., a "cold" portion).

Figure 3:
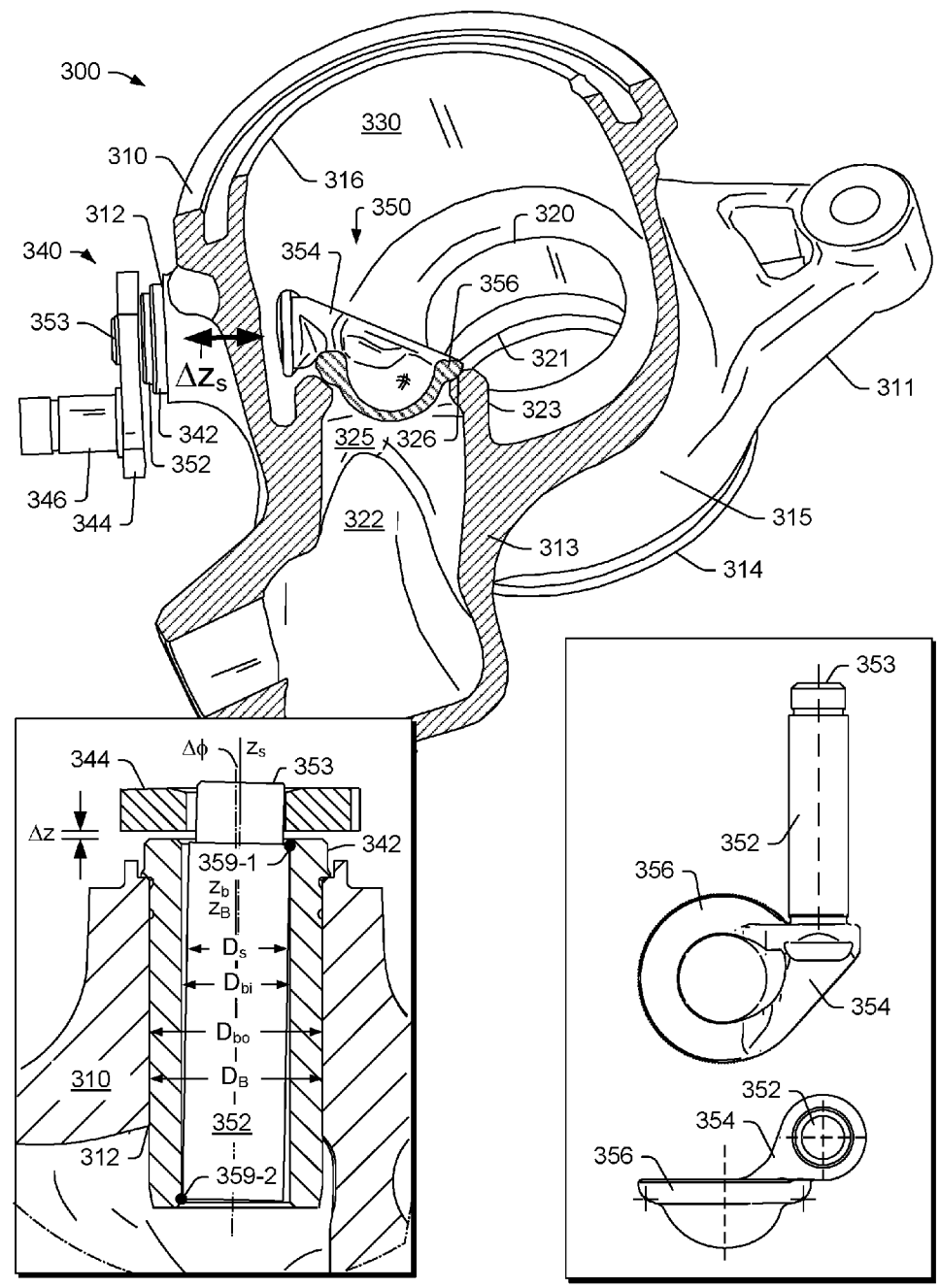
FIG. 3 is a cutaway view of an example of an assembly that includes a wastegate.

FIG. 3 shows an example of an assembly 300 that includes a wastegate arm and plug 350 that differs from the wastegate arm and plug 250 of the assembly 200 of FIG. 2. In particular, the wastegate arm and plug 350 includes a plug 356 that includes a substantially hemispherical shell portion. As an example, the wastegate arm and plug 350 may be a unitary component (e.g., optionally unitary with the shaft 352).

In the example of FIG. 3 the assembly 300 includes a turbine housing 310 that includes a mounting flange 311, a bore 312, an inlet conduit 313, a turbine wheel opening 314 (e.g., for receipt of at least a portion of a turbine wheel), a spiral wall 315, an exhaust gas outlet opening 316, a shroud wall 320, a nozzle 321, a volute 322 formed in part by the spiral wall 315, a wastegate wall 323 that defines (e.g., at least in part) a wastegate passage 325 where the wastegate wall 323 extends to a wastegate seat 326 that may be an interface between the wastegate passage 325 and an exhaust chamber 330.

In the example of FIG. 3, the turbine housing 310 may be a single piece or multi-piece housing. As an example, the turbine housing 310 may be a cast component (e.g., formed via sand casting or other casting process). The turbine housing 310 includes various walls, which can define features such as the bore 312, the turbine wheel opening 314, the exhaust gas outlet opening 316, the chamber 330, etc. In particular, the wastegate wall 323 defines at least in part the wastegate passage 325, which is in fluid communication with the inlet conduit 313 where a wastegate control linkage 340 and the wastegate arm and plug 350 are configured for opening and closing the wastegate passage (e.g., for wastegating exhaust gas and for not wastegating exhaust gas).

In the example of FIG. 3, the wastegate control linkage 340 includes a bushing 342 configured for receipt by the bore 312 of the turbine housing 310, a control arm 344 and a peg 346 and the wastegate arm and plug 350 includes a shaft 352, a shaft end 353, an arm 354 and the plug 356. As shown, the bushing 342 is disposed between the bore 312 and the shaft 352, for example, to support rotation of the shaft 352, to act to seal the chamber 330 from an exterior space, etc. The bore 312, the bushing 342 and the shaft 352 may each be defined by a diameter or diameters as well as one or more lengths. For example, the shaft 352 includes a diameter $D_s$, the bore 312 includes a diameter $D_B$ while the bushing 342 includes an inner diameter $D_{bi}$ and an outer diameter $D_{bo}$. In the example of FIG. 3, when the various components are assembled, as to such diameters: $D_B > D_{bo} > D_{bi} > D_s$. As to lengths, a length of the shaft 352 exceeds a length of the bushing 342, which exceeds a length of the bore 312. Such lengths may be defined with respect to a shaft axis $z_s$, a bushing axis $z_b$ and a bore axis $z_B$. As shown, the bushing 342 is disposed axially between a shoulder of the shaft 352 (e.g., a face of the arm 354 where the arm 354 and the shaft 352 meet) and the control arm 344 of the control linkage 340.

In the example of FIG. 3, a gap $\Delta z$ is shown between a surface of the bushing 342 and a surface of the control arm 344, which allows for axial movement of the shaft 352, for example, to facilitate self-centering of the plug 356 with respect to the wastegate seat 326. For example, the plug 356 may include shape that acts to self-center with respect to a shape of the wastegate seat 326. As an example, the plug 356 may include a toroidal portion and the wastegate seat 326 may include a conical surface such that the plug 356 may self-center with respect to the wastegate seat 326. Self-centering may be facilitated by application of force that acts to maintain the plug 356 in a closed position with respect to the wastegate seat 326.

As an example, the assembly 300 may be fitted to an exhaust gas conduit or other component of an internal combustion engine (see, e.g., examples of FIG. 1), for example, via a flange (see, e.g., the flange 211 of FIG. 2) such that exhaust is received via the inlet conduit 313, directed to the volute 322. From the volute 322, exhaust gas is directed via the nozzle 321 to a turbine wheel disposed in the turbine housing 310 via the opening 314 to flow and expand in a turbine wheel space defined in part by the shroud wall 320. Exhaust gas can then exit the turbine wheel space by flowing to the chamber 330 and then out of the turbine housing 310 via the exhaust gas outlet opening 316. As to wastegating, upon actuation of the control linkage 340 (e.g., by an actuator coupled to the peg 346), the wastegate arm and plug 350 may be rotated such that at least a portion of the received exhaust gas can flow in the wastegate passage 325 (e.g., as defined at least in part by the wastegate wall 323), past the wastegate seat 326 and into the chamber 330, rather than through the nozzle 321 to the turbine wheel space. The wastegated portion of the exhaust gas may then exit the turbine housing 310 via the exhaust gas outlet opening 316 (e.g., and pass to an exhaust gas system of a vehicle, be recirculated in part, etc.).

In the example of FIG. 3, the axes of the bore 312, the bushing 342 and the shaft 352 may be aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As mentioned, the wastegate arm and plug 350 differs from the wastegate arm and plug 250. In particular, the plug 356 differs from the plug 256. Further, the shape of the arm 354 differs from the shape of the arm 254. In an assembly such as the assembly 200 or the assembly 300, due to one or more factors, the wastegate arm and plug 350 may enhance performance, controllability, longevity, etc. when compared to the wastegate arm and plug 250.

As mentioned, as an example, the wastegate arm and plug 350 may be a unitary wastegate arm and plug (e.g., a monoblock wastegate arm and plug) or a wastegate arm and plug assembly.

As an example, the wastegate arm and plug 350 may have a lesser mass than the wastegate arm and plug 250 and, for example, a center of mass for the wastegate arm and plug 350 may differ compared to a center of mass for the wastegate arm and plug 250. As an example, due to the shape of the plug 356, it may perform aerodynamically in a more beneficial manner than the plug 256. For example, the plug 356 may, due to its shape, act to maintain its center more effectively than the plug 256. As an example, the wastegate arm and plug 350 may provide benefits as to controllability, for example, due to centering, reduced chatter, aerodynamics, etc. As an example, such benefits may improve performance, longevity, etc. of an actuator that is operatively coupled to the wastegate arm and plug 350 (e.g., for transitioning states, maintaining a state, etc.). As an example, such benefits may improve performance, longevity, etc. of a seal mechanism (e.g., bushing, bushings, etc.) for the shaft 352 of the wastegate arm and plug 350 (e.g., with respect to a bore).

As mentioned, an assembly may include a gap such as the axial gap $\Delta z$ that may facilitate, for example, self-centering of a plug with respect to a wastegate seat. However, where the plug is in an open position, the gap may possibly allow for movement of the plug, for example, due to forces from exhaust gas flowing past the plug. Where exhaust gas is pulsating, such forces may possibly cause rattling and noise. For example, forces may cause a shaft to move axially with respect to a bore, a bushing, etc. (e.g., separate components), optionally in a back and forth manner (e.g., consider vibration) that may cause periodic contacting between components that may be detrimental.

Figure 4:
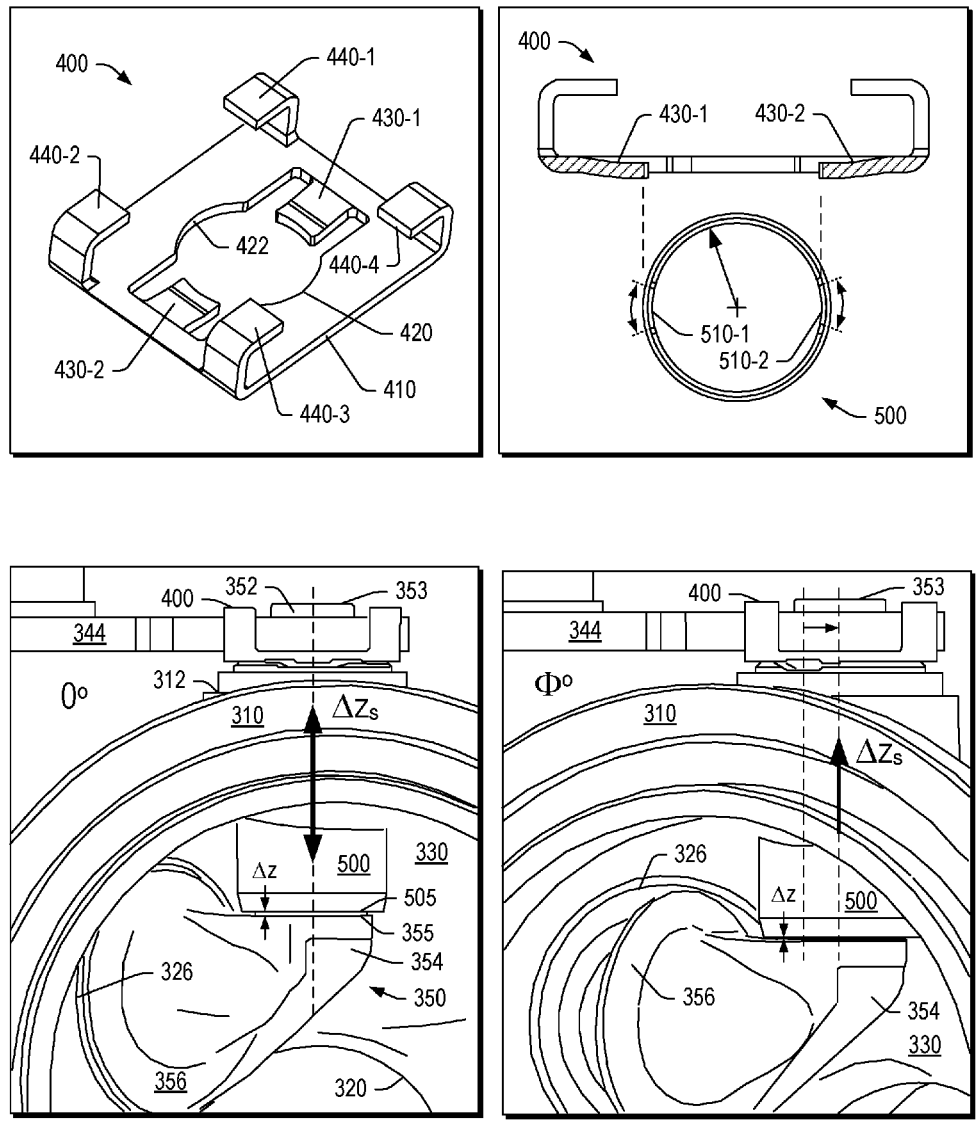
FIG. 4 is a series of views of an example of a biasing member, examples of assemblies that include a biasing member and an example of an assembly with respect to disengaged and engaged orientations of a biasing member.

FIG. 4 shows an example of a biasing cam 400 that may be operatively coupled to a portion of a control linkage for a wastegate plug. For example, the biasing cam 400 may be operatively coupled to the control arm 344 of the control linkage 340 of FIG. 3. In such an example, the biasing cam 400 may act to reduce risk of rattling and associated noise, for example, by applying a biasing force that biases the shaft 352 (e.g., axially biasing the shaft) when the plug 356 is in an open position. The biasing cam 400 may also, for example, allow for an amount of axial play when the plug 356 is in a closed position, for example, to allow for movement of the plug 356 (e.g., at least axially) with respect to the wastegate seat 326 (e.g., for self-centering, etc.).

In the example of FIG. 4, the biasing cam 400 may include a base 410 with an opening 420 defined in part by a surface, biasing members 430-1 and 430-2 and coupling members 440-1, 440-2, 440-3 and 440-4. As an example, the base 410 may be planar (e.g., see x and y dimensions) and include sides. As an example, the opening 420 may be defined in part by a dimension such as a radius (r) with respect to an axis ($z_s$). As an example, the base 410 may be defined in part by a thickness or thickness (e.g., see z dimension).

As an example, the biasing cam 400 may be formed from a unitary piece of material. For example, a piece of sheet metal may be stamped and formed to a shape of a biasing cam, for example, such as the biasing cam 400 shown in the example of FIG. 4. As an example, a biasing cam may be a multi-piece component that may include, for example, a base and one or more biasing components or members such as one or more springs, prongs, extensions, etc. that may be operatively coupled to the base.

In a cross-sectional view, the biasing members 430-1 and 430-2 are shown extending downward from the base 410 to respective ends, which may be disposed at approximately a radius of a radius of the opening 420. In such a configuration, the opening 420 may receive a shaft where a surface 422 of the opening 420 may contact a surface of the shaft and where the ends of the biasing members 430-1 and 430-2 may be moveable at least axially with respect to the surface of the shaft (e.g., for movement upward and downward to exert an appropriate biasing force). Also shown in the cross-sectional view are portions of the coupling members 440-1 and 440-3. For example, the coupling members 440-1 and 440-3 may include riser portions and inwardly facing clip portions. In such an example, the clip portions may act to operatively couple the biasing cam 400 to a control arm, etc.

As an example, a method may include operatively coupling a biasing cam to a control arm and then operatively coupling a shaft thereto (e.g., as received by an opening of the biasing cam).

As an example, as to cam functionality, locations of the biasing members 430-1 and 430-2 may determine an orientation or orientations where biasing may occur (e.g., consider angles about a central axis that define such locations). For example, if an assembly includes an orientation where the biasing members 430-1 and 430-2 do not contact or exert biasing force against another component, the biasing members 430-1 and 430-2 may be considered to be non-biasing (e.g., a non-biasing position). However, if an assembly includes an orientation where the biasing members 430-1 and 430-2 contact and exert a biasing force against another component, the biasing members 430-1 and 430-2 may be considered to be biasing (e.g., in a biasing position).

As an example, a biasing member may include a disengaged orientation and an engaged orientation. As an example, a disengaged orientation may include a clearance between a portion of a biasing cam and another component. As an example, an engaged orientation may include contact between a portion of a biasing cam and another component, for example, where a biasing force is applied via the contact. As an example, an engaged orientation may include a transitional orientation, for example, where rotation of a biasing cam results in increased biasing force, increased axial displacement of a shaft, etc.

As an example, a biasing cam may include at least one biasing member that may be in a disengaged or non-biasing position or an engaged or biasing position, for example, depending on orientation of an assembly. As an example, an orientation of an assembly may be determined by orientation of a plug with respect to a wastegate seat, for example, that may correspond to orientation of a shaft operatively coupled to the plug (e.g., degrees of rotation of the shaft with respect to a bore, etc.).

FIG. 4 also shows an example of the biasing cam 400 operatively coupled to the control arm 344 where the opening 420 receives the shaft 352. Also shown in the example of FIG. 4 is a bushing 500 that includes recesses 510-1 and 510-2 that cooperate with the biasing members 430-1 and 430-2 of the biasing cam 400. As an example, the recesses 510-1 and 510-2 may, for example, receive portions of the biasing members 430-1 and 430-2 while providing axial clearance. In such an example, the biasing members 430-1 and 430-2 may be capable of axial movement within the recesses 510-1 and 510-2 for purposes of axial movement of the shaft 352 and self-centering of a plug, operatively coupled to the shaft 352, with respect to a wastegate seat.

As an example, contact may occur between the biasing members 430-1 and 430-2 and recess surfaces of the bushing 500 that may allow for some amount of biasing force to be applied therebetween. However, such an amount of biasing force may be less than that achieved when the biasing members 430-1 and 430-2 of the biasing cam 400 are moved to not align with the recesses 510-1 and 510-2. As an example, the recesses 510-1 and 510-2 may include at least one cambered (e.g., sloping) side such that the biasing members 430-1 and 430-2 may ride the cambered side, for example, in a manner that riding higher may exert a higher biasing force (e.g., consider a Hookean biasing force where force increases with compression).

As an example, an assembly may include a biasing cam that includes at least one biasing member and a component with at least one feature that can determine whether the at least one biasing member applies a biasing force. For example, the at least one feature may be a recess of a bushing that can, in a particular orientation, receive the at least one biasing member optionally with an axial clearance and that can, in a different orientation (e.g., or orientations), not receive the at least one biasing member or receive the at least one biasing member in a manner by which a biasing force is exerted between the biasing cam and the bushing (e.g., to take up, reduce, etc. axial play).

As an example, an assembly may include a biasing cam that can provide "zero clearance" between a bushing and a control arm for one or more orientations of the control arm with respect to the bushing and that can provide for clearance between the bushing and the control arm in a manner that can allow for centering of a plug with respect to a wastegate seat (e.g., where the plug is operatively coupled to the control arm, for example, via a shaft). In such an example, the biasing cam may be a spring that exerts force at certain plug opening angles (e.g., cam functionality). In such a manner, the biasing cam may reduce risk of rattling and associated noise while still allowing for self-centering of a plug with respect to a wastegate seat. In other words, as an example, a biasing cam may act selectively as a spring that can be loaded to remove clearance between a control arm and a bushing if a plug is open but may not be loaded if the plug is closed. As an example, a biasing cam may include a linear coil spring (e.g., positioned between a control arm and a housing, etc.). As an example, a spring may be a metal spring.

As an example, a biasing cam may assist with opening of a plug with respect to a wastegate seat. For example, where an actuator exerts a downward force to maintain a plug in a closed position, the biasing cam may have a clearance such that it does not exert an opposing force. Whereas, upon opening of the plug, the actuator must overcome the downward force by applying an upward force; noting that, upon rotation of the biasing cam, it too may apply an upward force. Thus, in such an example, the biasing cam may reduce an amount of upward force to be exerted by such an actuator (e.g., once the biasing cam engages and exerts its biasing force).

Figure 6:
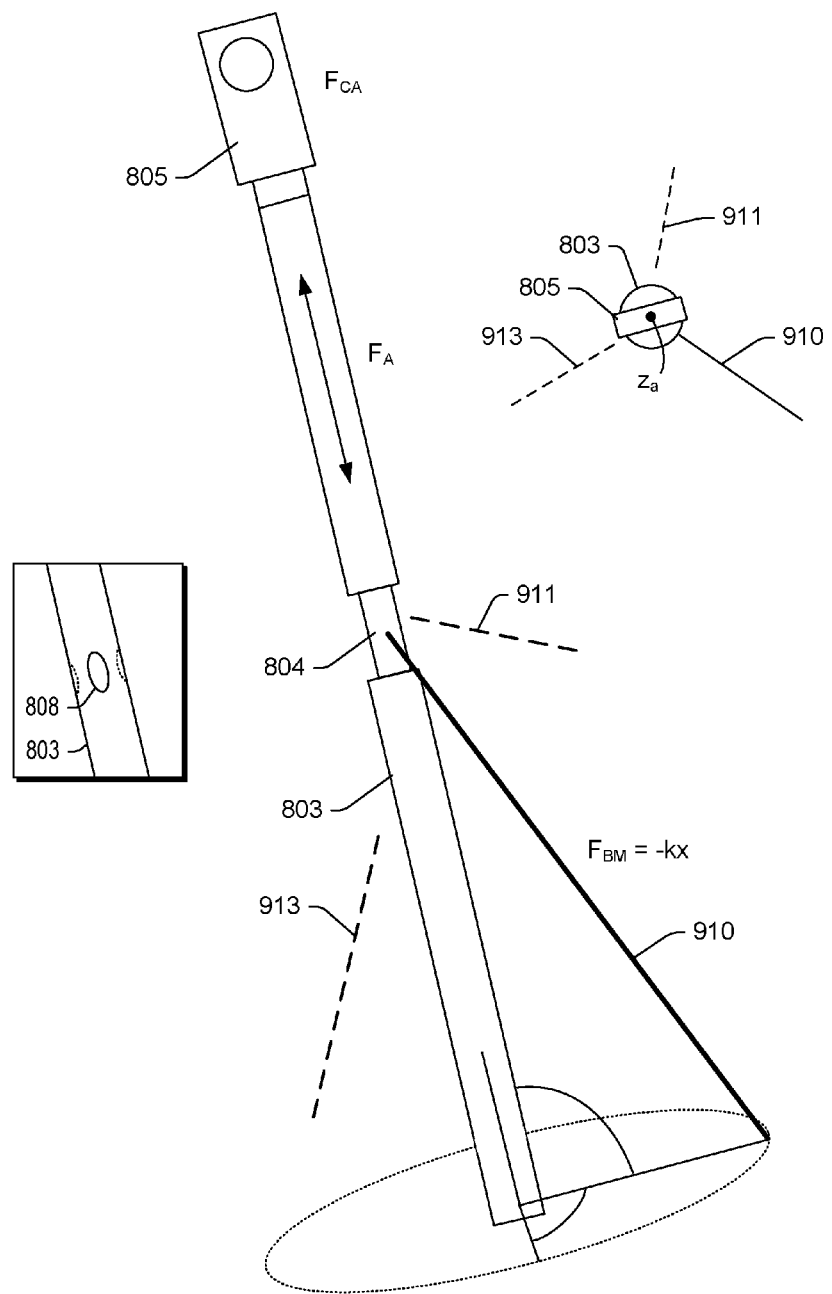
FIG. 6 is a diagram that illustrates examples of various degrees of freedom of a control rod with respect to examples of various forces.

FIG. 4 further shows examples of the assembly in two orientations, a so-called 0 degrees orientation (e.g., a disengaged orientation) and a Φ degrees orientation (e.g., an engaged orientation) where the biasing member 430-1 of the biasing cam 400 is engaged by a surface of the busing 500. Various dimensions are shown in FIG. 4. As an example, a biasing cam and bushing clearance may be altered in a manner dependent on orientation of the control arm 344 with respect to the bushing 500. For example, a method may include orienting the biasing member 430-1 of the biasing cam 400 with respect to the recess 510-1 of the bushing 500 for altering a biasing cam to bushing axial clearance. As shown in the example of FIG. 6, altering may include moving the shaft 352 axially outwardly away from the turbine housing 310.

FIG. 4 shows examples of the assembly in the two orientations. As shown, one orientation is associated with a closed orientation (e.g., or position) of the plug 356 with respect to the wastegate seat 326 and the other orientation is associated with an open orientation (e.g., or position) of the plug 356 with respect to the wastegate seat 326 (e.g., where the shaft 352 is translated axially outwardly by a biasing force exerted by the biasing cam 400).

As shown in the examples of FIG. 4, a clearance may be reduced between a face 505 at the end of the bushing 500 and a face 355 at the end of the arm 354 when the plug 356 transitions from a closed orientation to an open orientation with respect to the wastegate seat 326. As an example, a reduction in clearance may act to impede gas flow (e.g., exhaust leakage) at an interface or interfaces, for example, as bias exerted by a biasing cam may act to pull the 355 against the face 505 of bushing 500.

As an example, during operation, a chamber space of a turbine assembly may have a pressure that exceeds an ambient pressure. In such an example, a pressure differential may act as a driving force for flow of exhaust from the chamber space to an ambient space. As such a flow of exhaust may occur prior to an exhaust gas treatment unit (see, e.g., the unit 107 of FIG. 1), it may be detrimental as to a goal of achieving an environmental standard or standards. As an example, wastegating may occur to avoid excessive boost to an internal combustion engine. As an example, wastegating may act to increase a pressure differential between a chamber space and an ambient space. In the example of FIG. 4, an axially outward shift of the shaft 352 responsive to action of the biasing cam 400 being rotated to a biasing position as an actuator acts to effectuate wastegating, such a shift may act to reduce a clearance or clearances that act to impede flow of exhaust gas from the chamber 330 to an ambient space via the bore 312. Such an approach may act to reduce rattling, vibration, etc., which, in turn, may act to reduce flow of exhaust gas from the chamber 330 to an ambient space via the bore 312.

Figure 5:
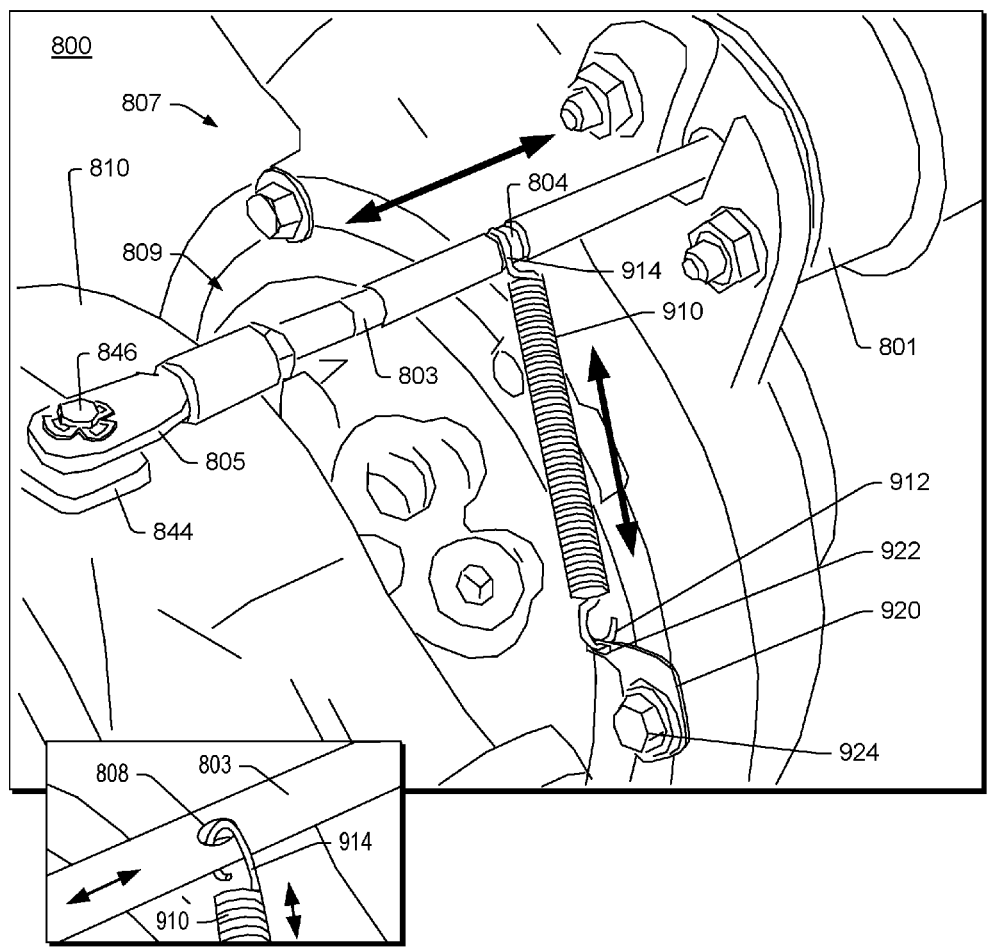
FIG. 5 is a view of an example of an assembly that includes an example of a biasing mechanism.

FIG. 5 shows an example of an assembly 800 that includes an actuator 801 operatively coupled to a control rod 803 (e.g., a control link or actuator link) that includes a notch 804. In the example of FIG. 5, the actuator 801 is coupled to a compressor housing 807 that is coupled to a center housing 809 that is coupled to a turbine housing 810 that includes a wastegate valve controllable via a control arm 844 (e.g., via rotation of the control arm 844).

As shown in the example of FIG. 5, a peg 846 extends from the control arm 844 where the peg 846 is coupled to the control rod 803, for example, via a coupler 805 that may be adjustable (e.g., as to axial position along with respect to the control rod 803 via threads, etc.). As shown, a spring 910 may be provided as a biasing mechanism. In the example of FIG. 5, the spring 910 may be a coil spring that includes a fixed end 912 that operatively couples to the compressor housing 807 via a clamp 920 (see, e.g., an opening 922 in the clamp 920) and that includes a movable end 914 that operatively couples to the control rod 803 via the notch 804 (e.g., or other feature such as an opening, etc.). For example, an inset view of a portion of an assembly shows an example of an opening 808 in the control rod 803 where a movable end 914 operatively couples to the control rod 803 via the opening 808.

In the example of FIG. 5, various components may be arranged such that the spring 910 exerts a biasing force on the control rod 803 in a manner that depends on position of the control rod 803 as controlled by the actuator 801. For example, the spring 910 may not exert a load (or exert a partial load) when the plug coupled to the control arm 844 is about to close (e.g., or in a closed position) and the spring 910 may exert an increased load with respect to increased stroke of the control rod 803, for example, for opening the plug (e.g., opening a wastegate for wastegating). In such an example, the direction of force exerted by the spring 910 on the control rod 803 may act to pull a shaft coupled to the control arm 844 in an outward direction, for example, to minimize a gap or clearance. As an example, the spring 910 may, in a first state, allow for axial movement of a shaft coupled to the control arm 844 where such movement may facilitate centering of a plug, coupled to (e.g., optionally integrally) to the shaft, with respect to a wastegate seat of the turbine housing 810. In such an example, the spring 910 may, in a second state, cause axial movement of the shaft outwardly, for example, to reduce a clearance (e.g., between a face of a bushing and a face of the shaft).

FIG. 6 shows an example of the control rod 803 of FIG. 5 with respect to the spring 910, which is an off-axis biasing mechanism in that its axis does not align with that of the control rod 803. As an example, the spring 910 may be characterized at least in part by a spring constant k, for example, as in an equation $F_{BM}=-kx$ where x may be a length dimension or position of the spring 910. As shown in the example of FIG. 6, an actuator force $F_A$ may be applied to the control rod 803, for example, as including a component along the axis of the control rod 803 (e.g., a primary component of actuator force). Also shown in the example of FIG. 6 is a control arm force $F_{CA}$ as associated with a control arm being operatively coupled to the coupler 805.

As shown in the example of FIG. 6, one or more biasing mechanisms 910, 911 and 913 may be operatively coupled to the control rod 803 or a component operatively coupled to the control rod 803. In such an example, the one or more biasing mechanisms 910, 911 and 913 may be off-axis and change in length responsive to movement of the control rod 803. One or more off-axis biasing mechanisms (e.g., springs, etc.) may act to apply force to a control rod or a control link in a manner that depends on position of the control rod or the control link, for example, as controlled by an actuator that may control opening and/or closing of a wastegate valve (e.g., position of a wastegate plug with respect to a wastegate seat).

Figure 7:
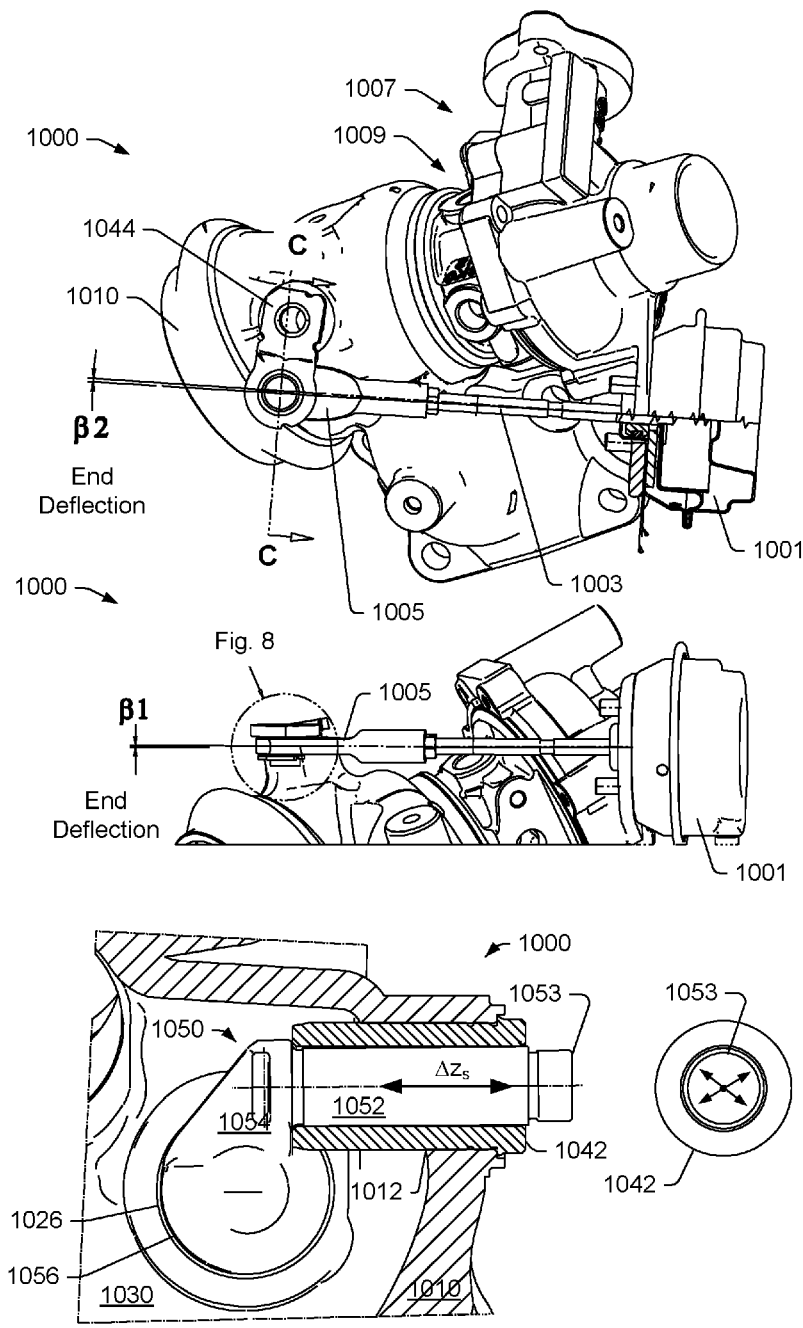
FIG. 7 is a series of views of an example of an assembly that illustrates examples of deflections.

FIG. 7 shows an example of an assembly 1000 that includes an actuator 1001 operatively coupled to a control link 1003 (e.g., an actuator link). In the example of FIG. 7, the actuator 1001 is coupled to a compressor housing 1007 that is coupled to a center housing 1009 that is coupled to a turbine housing 1010 that includes a wastegate valve controllable via a control arm 1044 (e.g., via rotation of the control arm 1044).

A cutaway view shows the turbine housing 1010 as including a bore 1012, a wastegate seat 1026, a chamber 1030, a bushing 1042 and a wastegate arm and plug 1050 that includes a shaft 1052 with a shaft end 1053, an arm 1054 and a plug 1056.

As shown in FIG. 7, the control link 1003 may experience deflections such as end deflection in a direction β1 and end deflection in a direction β2. As indicated in the cutaway view, the shaft 1052 may experience movement along its axis as well as angular movement that, for example, off-sets the axis of the shaft 1052 from an axis of the bore 1012 and/or an axis of the bushing 1042. For example, tilting of the shaft 1052 may cause the shaft 1052 and/or the bushing 1042 to form points of contact that differ at portions of the shaft 1052 and/or the bushing 1042 with respect to the bushing 1042 and/or the bore 1012, respectively.

Figure 8:
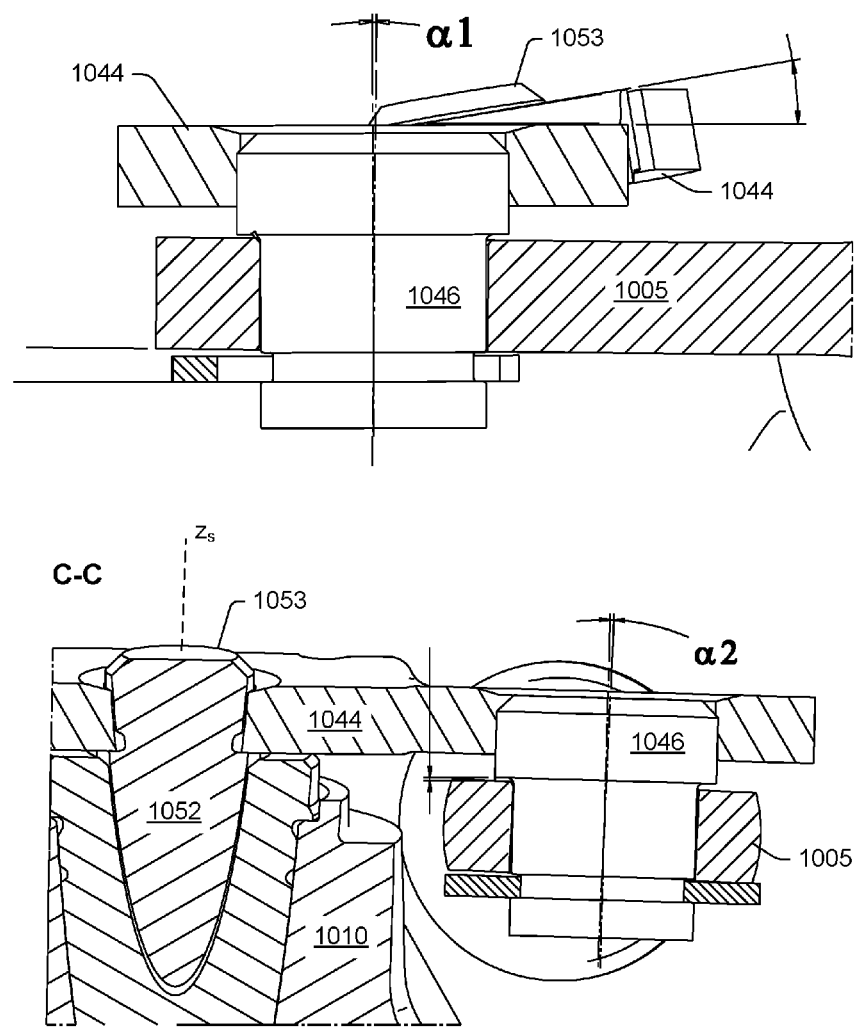
FIG. 8 is a series of views of portions of the assembly of FIG. 7.

FIG. 8 shows cutaway views of portions of the assembly 1000 of FIG. 7, including a cutaway view along a line C-C. As shown in FIG. 7, a control arm 1044 may be operatively coupled to the control link 1003 (e.g., an actuator link) via a peg 1046 and the peg 1046 may experience deflections such as end deflection in a direction α1 and end deflection in a direction α2. Such deflections may be due to forces. As an example, one or more biasing mechanisms may be included in the assembly 1000 that can apply force to reduce one or more deflections, increase one or more deflections, etc.

As an example, an assembly can include a flexible element such as a spring that can preload multiple joints of a wastegate linkage. In such an example, the flexible element may alter the kinematics of the wastegate linkage. As an example, a flexible element may alter one or more clearances, positions, etc. of one or more components of a wastegate linkage and/or, for example, one or more components that may be associated with a wastegate. As an example, a method can include preloading multiple joints of wastegate kinematic components by a flexible element. In such an example, a single flexible element may provide for such preloading of multiple joints. As an example, a flexible element can be a spring. As an example, a flexible element can be an elastic element that can flex from a first shape and to another shape and return to the first shape.

As an example, a turbocharger's wastegate controller (e.g., including an actuator) and associated linkage can modulate an amount of exhaust gas used for powering an exhaust gas turbine of the turbocharger. For example, a wastegate (e.g., a wastegate valve) may act to direct excessive exhaust gas for bypass of a turbine stage. A controller can be coupled to a linkage that couples to a wastegate where the controller can be actuated to cause the wastegate to move, for example, to move toward a closed state, to move toward an open state, etc. In such an example, the close state can cause exhaust gas to be directed to a turbine wheel while the open state can cause at least a portion of exhaust gas exiting one or more cylinders of an internal combustion engine to bypass the turbine wheel (e.g., via a conduit, a chamber, etc.).

Various types of controllers exist. For example, a controller can include a pneumatic actuator and/or an electric actuator. As an example, an actuator may include one or more components that move in a rotary and/or in a linear manner. For example, a rotary movement component can rotate and a linear movement component can translate while a rotary/linear movement component can rotate and translate (e.g., at different times and/or at the same time, simultaneously).

As an example, a rotary electric actuator (REA) can be an electro mechanical device that can be mounted, for example, on a compressor housing and connected to a wastegate control linkage. As an example, such an actuator may be operatively coupled to an Engine Management Unit (EMU) (e.g., or ECU), for example, via one or more signaling mechanisms (e.g., analog, digital, pulse-width modulation (PWM), controller area network (CAN), etc.) for receiving one or more control signals (e.g., optionally transmitting one or more signals, etc.). Electric actuation may offer faster response than pneumatic actuation. For example, a REA may be able to respond more rapidly to a control signal; consider a scenario where it may respond in about one third of the time (e.g., consider a response of about 150 ms versus a response of about 500 ms). As an example, an REA can include on-board position sensing. As an example, faster response and more precise control can help improve engine performance, fuel efficiency and emissions control.

As an REA may not rely on an internal combustion engine as a pressure source as with some pneumatic actuators, it may provide for operation without a so-called vacuum systems. As an example, an REA may include circuitry that can provide information to assist with diagnostics, etc.

As mentioned, an REA can operate with a response time that can be less than that of a pneumatic actuator. Where slack exists in a control linkage (e.g., due to clearances, lack of load, etc.), upon application of force by an REA, a taking up of the slack may be accompanied by contacting between components, which may generate noise, lead to wear, etc. Overtime, controllability may be impacted. Where an REA provides information germane to positioning, diagnostics, etc., the quality of such information may be impacted. For example, changes in positions may be known with less certain due to clearances, slack, etc., and taking up of clearances, slack, etc.

As an example, a method can include determining one or more tolerance stack-ups or tolerance stacks as to effects of accumulated variation(s) that may be allowed by specified dimensions and tolerances associated with joints of a control linkage. Such a method may include selecting a biasing element and/or one or more points of contact for a biasing element (e.g., coupling points) that can act to load the joints. In such an example, an assembly that includes a biasing element that loads joints may be operated where loading acts to reduce noise, wear, etc.

As an example, an actuator can be used together with a linkage, which can be a kinematic chain of operatively coupled components that mechanically connect a particular actuator with a wastegate (e.g., a wastegate valve).

As an example, a linkage can include a plurality of "bars" (e.g., bar or bar-like components). For example, consider a mechanism topology that includes a four-bar linkage for a rotary actuator or crank mechanism that may be used for a linear actuator.

As an example, a four-bar linkage (e.g., a "four-bar") can be a movable "closed chain" linkage that includes four bodies, called bars or links, connected via joints. As an example, two joints may be substantially fixed and two joints may be movable (e.g., floating joints). For example, a joint at an actuator and a joint at a turbine housing may be substantially fixed where at such a joint a component (e.g., a rotational pin driven by an electric motor and a shaft of a wastegate) can rotate while its axis of rotation remains steady (e.g., rotational pin axis and shaft axis).

As an example, a linkage can include joints. For example, consider a joint type such as a cylindrical rotary joint (e.g., a cylindrical pin in a cylindrical opening or bore). Such a joint can introduce radial and axial clearances that cover assembly tolerances (stack-up) and, for example, what may be called technological tolerances. One or more clearances may lead to one or more issues when a linkage is unloaded. As an example, issues may include one or more of noise issues, wear issues and also position hysteresis issues.

As an example, to load a linkage, which may otherwise be substantially unloaded, an assembly can include a spring (e.g., axial or torsion, tensile or compressive) that is attached between two links of a kinematic linkage (e.g., a kinematic linkage mechanism) that are operatively coupled via a rotary joint. In such an example, the spring can apply torque (e.g., torque between the two links). While a spring is mentioned, as an example, two or more springs may be included. As an example, a spring or springs may apply force or forces via one or more contact points with one or more components.

As an example, a spring may be a biasing element that is made of a material and shaped such that its shape can change where a change in shape may alter an amount of force or amounts of forces that can be applied.

As an example, a biasing element may be characterized at least in part by its elasticity. As an example, a biasing element may be characterized at least in part by linear and/or non-linear elasticity. As an example, one or more linearizing assumptions of linear elasticity can include infinitesimal strains or relatively "small" deformations (or strains) and substantially linear relationships between the components of stress and strain. As an example, linear elasticity may be considered valid for stress states that do not produce yielding (e.g., yielding that would cause failure of a biasing element). As an example, a biasing element may be characterized at least in part by Hooke's law, for example, as a first order linear approximation to a real response of a spring or another elastic body (e.g., to applied force).

As an example, a biasing element may be applied between a wastegate crank (e.g., control arm) and a rod (e.g., a link-plate, etc.). As an example, an assembly can include a biasing element that loads a plurality of turbocharger turbine wastegate control linkage joints. In such an example, the biasing element may be located at a control arm and a control link that form a joint about a pin (e.g., a peg). As an example, a biasing element may be located at a control link and a coupling arm that form a joint about a pin (e.g., a peg).

As an example, a biasing element may be located at a "hot" joint or at a "cold" joint. In such an example, the "hot" joint may be closer to an exhaust gas turbine than the "cold" joint. As an example, a joint that includes a shaft of a wastegate that is received by a bore of a turbine housing may be considered a hotter or a hottest joint. As an example, a biasing element may be located at a joint that is not the hottest joint in a control linkage.

As to locating a biasing element at a "hot" joint, as mentioned, a hot joint may be exposed to heat energy that may cause thermal expansion and/or otherwise affect one or more components. As an example, clearances may change in a temperature dependent manner, which, in turn, may affect contacting, friction, wear, noise, etc. As a "hot" joint may be in a relatively harsh environment that may include temperature cycling and repetitive motion at elevated temperatures well above ambient temperatures, a biasing element disposed at such a joint may act to "control" relationships between joint components in a manner that can reduce wear, noise, etc. Further, as an example, loading via such a biasing element may be transmitted to one or more other joints, which, in turn, may act to reduce wear, noise, etc. of such other one or more joints. As an example, a biasing element may act in a manner that can reduce leakage of exhaust gas via a bore of a turbine housing. As an example, a biasing element may act in a manner that differs for an opening of a wastegate plug with respect to a wastegate seat and for closing of a wastegate plug with respect to a wastegate seat.

As an example, an assembly may optionally include a biasing element located at a first joint and a biasing element located at a second joint. In such an example, both the first joint and the second joint may be joints of a control link (e.g., a link that spans a distance between a control arm and a coupling arm). As an example, a control linkage can include a plurality of "links", for example, consider a control arm link, a control link and a coupling arm link. As an example, an assembly may include more than three links (e.g., with an associated number of joints).

As an example, a joint may be a pivot joint. For example, a pivot joint can include a pivot axis as defined, for example, via a pin (e.g., a peg, etc.). In such an example, the pin may be fixed or rotational with respect to one or more components of the pivot joint. As an example, a component can include an opening (e.g., a bore) that receives at least a portion of a pin to form a joint where the pin may be fixed to another component that forms the joint. As an example, a pin may be coupled to one or more components and may be fixed or rotational with respect to one or more components (e.g., consider a pin set in a bore of one link and set in a bore of another link yet independently rotational within the bores). As an example, one or more of a C-clip, a cotter pin, etc., may secure a pin (e.g., a peg, etc.) with respect to a link or links.

As an example, a rotational pin of an actuator can be fixed to a link (e.g., a coupling arm) such that rotation of the rotational pin causes the link to rotate. As an example, a link may be fixed to a shaft such that movement of the link causes the shaft to rotate. As an example, a fixation mechanism may include one or more of an interference fit, welding, meshing of teeth, a bayonet, threads, key/keyway, etc. As an example, a control arm may be welded to a shaft of a wastegate.

As an example, a biasing element may be positioned such that its exposure to heat (e.g., heat energy) may be reduced, for example, less than that of a turbine housing at a bore for a wastegate shaft. As an example, a biasing element may be coated at least in part with a material that is a thermal insulator. In such an example, transfer of heat energy to the biasing element and/or a rate of heat energy transferred to the biasing element may be reduced. As an example, a thermal barrier coating may be included on at least a portion of a biasing element and/or on at least a portion of a component that is in contact with a biasing element. As an example, a thermal barrier may include a bond layer, thermally grown oxide layer, and ceramic layer (e.g., yttria-stabilized zirconia (YSZ), etc.).

As an example, a biasing element may act to reduce one or more of noise, wear, hysteresis, and actuator load. As an example, proper direction and dimensioning of stiffness of a biasing element, may allow for decreasing actuator power (e.g., torque) compared to an assembly without such a biasing element. For example, a biasing element may provide a load to a joint that corresponds to a clockwise direction of rotation or to a counter-clockwise direction of rotation of an electric motor shaft of an electric actuator (e.g., an REA). Such a load may correspond to a force direction for maintaining a closed state or an open state of a wastegate plug with respect to a wastegate seat. As an example, a biasing element may provide for reducing a size, a power rating, a torque rating, etc. of an actuator compared to an assembly that does not include the biasing element.

As an example, a method can include drilling holes in a crank (e.g., control arm) and in a rod (e.g., control rod, which may be a link-plate) and coupling a biasing element to the crank via a drilled hole and coupling the biasing element to the rod via a drilled hole. In such an example, a drilled hole may include a sleeve that may be a thermal barrier material (e.g., an insulator).

As an example, a biasing element may be a multi-piece biasing element, for example, pieces coupled in series and/or in parallel. As an example, a method can include providing a crank pin that is of an increased height, for example, to allow for accommodation (e.g., fitting of) a biasing element. As an example, a method can include providing a crank (e.g., a control arm) that may be shaped to operatively couple to a biasing element and/or to accommodate a biasing element. For example, a crank may be shaped with an extension that can include a feature (e.g., a notch, an opening, a hook, etc.) for coupling to a biasing element. As an example, as to shape, a crank may be "tiered" in that a first tier provides for coupling to a first pin and a second tier provides for coupling to a second pin. As an example, a tier, tiers, a portion or portions between tiers, etc., may provide for a desired alignment of a biasing element with a rod (e.g., a link, which may be one or more of circular, oval, polygonal, etc., as to its cross-section). As an example, a feature may be or include an opening, a notch, a hook, etc., for coupling a biasing element (e.g., an end or end fixture of a biasing element).

As an example, a biasing element may be included in an assembly optionally along with a biasing cam such as, for example, the biasing cam 400 of FIG. 4. In such an example, the biasing cam may apply force to a joint and a biasing element may apply torque to more than one joint. As an example, consider a biasing element that can preload a plurality of joints in a rotary motion actuator kinematic assembly. As an example, an off-axis spring may be coupled to one or more links of a linkage.

As an example, a turbocharger with a rotary e-actuator (e.g., a REA) may include a linkage operatively coupled to the rotary e-actuator where a flexible element (e.g., an axial compressive spring or other biasing element) is attached to the linkage, for example, via one or more drilled holes, a shape of a portion of the flexible element, etc. For example, a flexible element may be attached (e.g., in contact with) two links. As an example, a flexible element may be seated on a pin and contact two links, for example, where the pin and the two links form a joint.

As an example, a turbocharger with a rotary e-actuator may include a flexible element (e.g., a torsion spring or other biasing element) that may be attached, for example, via one or more drilled holes, via shape of portions of the flexible element, via a pin, etc.

As an example, a wastegate crank and rod of a turbocharger with rotary e-actuator can include a torsion spring (e.g., tensile or compressive or other biasing element) that may be coupled to a crank pin. As an example, such a spring may be secured at least in part by a circlip or by other retention piece (e.g., a C-clip, a cotter pin, etc.).

Figure 9:
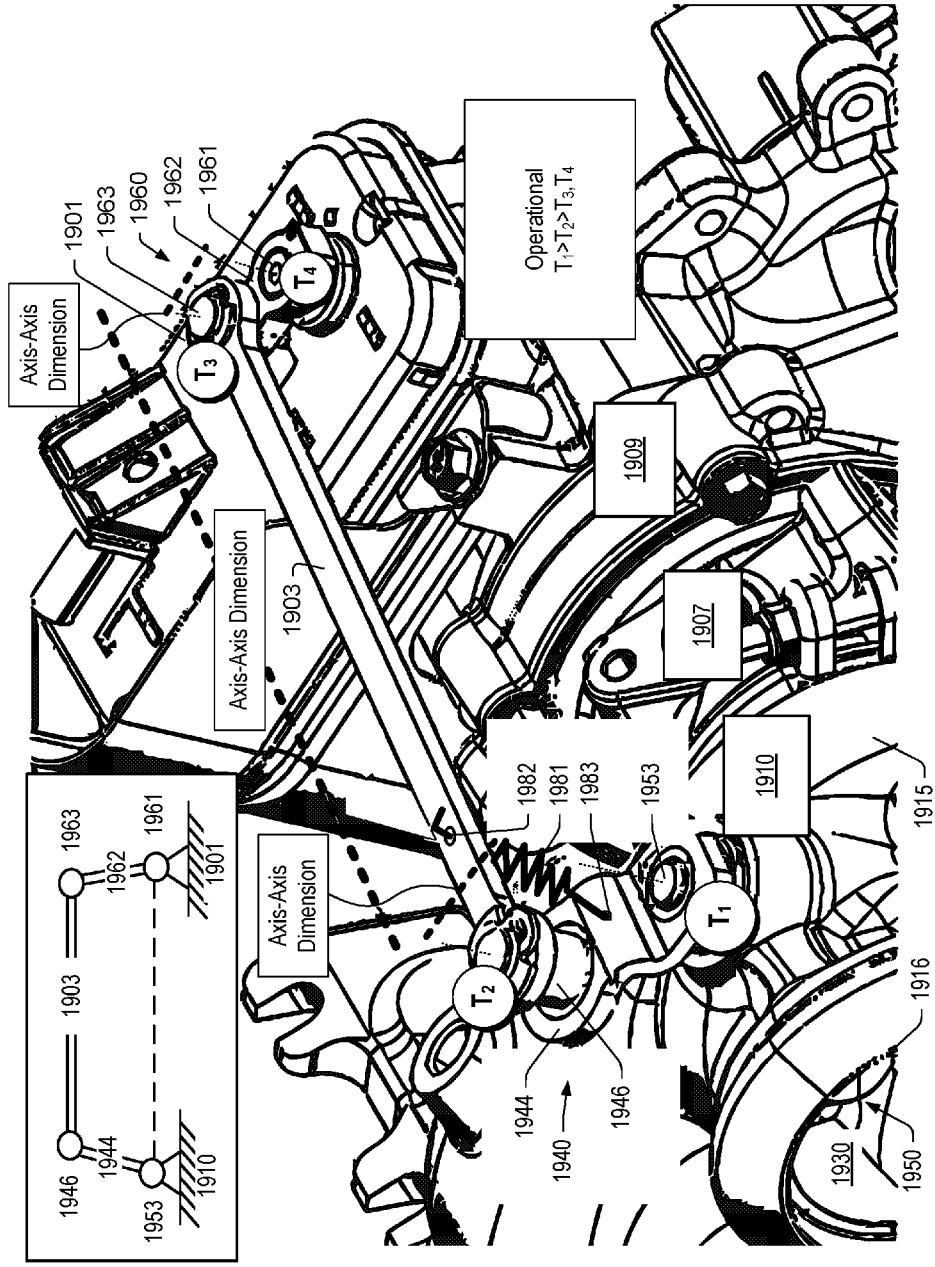
FIG. 9 is a view of an example of an assembly.

FIG. 9 shows a perspective view of an example of an assembly 1900 that includes an actuator 1901 (e.g., a controller, an actuator of a controller, etc.), an actuator link 1903 (e.g., a control rod, a control link, etc.), a center housing 1907 (e.g., to house a bearing, bearings, etc. for a turbocharger shaft, etc.), a compressor housing 1909, a turbine housing 1910 that includes a bore, a spiral wall 1915 (e.g., that defines, in part, a volute), an exhaust outlet opening 1916, a wastegate wall that extends to a wastegate seat, and an exhaust chamber 1930 where exhaust that flows into the exhaust chamber 1930 can exit via the exhaust outlet opening 1916. As an example, the actuator link 1903 may be a single piece or a plurality of pieces. As an example, the actuator link 1903 may be or include a rod, a plate, or another type of component.

In the example of FIG. 9, the turbine housing 1910 may be a single piece or multi-piece housing. As an example, the turbine housing 1910 may be a cast component (e.g., formed via sand casting or other casting process). As shown, the turbine housing 1910 includes various walls, which can define features such as the bore, a turbine wheel opening, the exhaust outlet opening 1916, the chamber 1930, etc. In particular, the wastegate wall can define a wastegate passage in fluid communication with an exhaust inlet conduit where a wastegate control linkage 1940 and a wastegate arm and plug 1950 are configured for opening and closing the wastegate passage (e.g., for wastegating exhaust).

In the example of FIG. 9, a portion of the wastegate control linkage 1940 includes a bushing configured for receipt by the bore of the turbine housing 1910, a control arm 1944 and a peg 1946 (e.g., a pin) and the wastegate arm and plug 1950 includes a shaft, a shaft end 1953, an arm and a plug. The bushing can be disposed between the bore and the shaft, for example, to support rotation of the shaft, to help seal the chamber 1930 from an exterior space, etc. As an example, the bushing and/or one or more other components may help to hinder flow of exhaust (e.g., leakage of exhaust) from the chamber 1930 to an exterior space (e.g., an ambient environment). The bore, the bushing and the shaft may each be defined by a diameter or diameters as well as one or more lengths.

As an example, the assembly 1900 may be fitted to an exhaust conduit or other component of an internal combustion engine (see, e.g., examples of FIG. 1), for example, via a flange such that exhaust is received via an inlet conduit that may direct exhaust to a volute (e.g., or volutes) that may be defined at least in part by the spiral wall 1915. As an example, a volute (e.g., or volutes) may direct exhaust (e.g., via a nozzle or nozzles) to a turbine wheel disposed in the turbine housing 1910 where the exhaust may flow and expand in a turbine wheel space defined in part by the turbine housing 1910. Exhaust may then exit the turbine wheel space by flowing to the chamber 1930 and then out of the turbine housing 1910 via the exhaust outlet opening 1916.

As to wastegating, upon actuation of the portion of the control linkage 1940 (e.g., by the actuator link 1903 being operatively coupled to the peg 1946), the wastegate arm and plug 1950 may be rotated such that at least a portion of the received exhaust of the turbine housing 1910 can flow in the wastegate passage defined by the wastegate wall, past the wastegate seat and into the chamber 1930, rather than through a nozzle to a turbine wheel space (e.g., via a volute to a turbine wheel space). The wastegated portion of the exhaust may then exit the turbine housing 1910 via the exhaust outlet opening 1916 (e.g., and pass to an exhaust system of a vehicle, be recirculated in part, etc.).

As an example, the portion of the control linkage 1940 may exert a force that acts to force the plug in a direction toward the wastegate seat. As an example, the actuator 1901 may be mounted to the assembly 1900. As an example, the actuator 1901 may be a rotary actuator, for example, for moving one or more coupling components of another portion of the wastegate control linkage 1960. For example, consider a rotational peg 1961 (e.g., a pin, a shaft, etc.) that can be rotated by the actuator 1901 via electrical power supplied to the actuator 1901. In such an example, the rotational peg 1961 may be a shaft of an electric motor or may be a shaft coupled to a shaft of an electric motor (e.g., via one or more gears, couplings, etc.). As shown, a coupling arm 1962 can be fit to the rotational peg 1961 such that rotation thereof causes the coupling arm 1962 to rotate in a clockwise or counter-clockwise direction (e.g., by a number of degrees as may be measured about an axis of the rotational peg 1961). As shown, a coupling peg 1963 (e.g., a pin) is coupled to the actuator link 1903 and to the coupling arm 1962. In such an example, rotation of the coupling arm 1962 causes the actuator link 1903 to move, for example, either toward the turbine housing 1910 or away from the turbine housing 1910 (e.g., depending on a desired state of the wastegate plug with respect to the wastegate seat). Such movement can thereby cause the control arm 1944 to rotate as it is coupled to the actuator link 1903 via the peg 1946 (e.g., a pin). Further, as the control arm 1944 is attached to the wastegate shaft at or proximate to the end of the wastegate shaft 1953, movement of the control arm 1944 in a clockwise or counter-clockwise direction can cause the wastegate arm and plug 1950, as coupled to the wastegate shaft or integral to the wastegate shaft, to move.

FIG. 9 also shows an approximate schematic view of a four-bar linkage where reference numerals are included that may correspond to various features of the assembly 1900. In the approximate schematic view, a dashed line represents a "bar" or link that may be formed by components such as the actuator 1901, the compressor housing 1909, the center housing 1907 and the turbine housing 1910 being coupled together. Thus, two joints may be substantially fixed in space and two joints may be movable in space, for example, responsive to rotation of components that form the two fixed joints. For example, rotation of the rotational peg 1961 of the actuator 1901 causes the shaft of the wastegate (see, e.g., the end of the shaft 1953) to rotate where pivoting occurs at the floating joints (e.g., as to the "links" 1962, 1903 and 1944) about axes defined by the coupling peg 1963 and the peg 1946. While pegs and pins are mentioned, coupling at a joint may be made via one or more types of elements. For example, consider concentric cylindrical components, a circular socket that receives a circular plug, etc.

In the example of FIG. 9, the assembly 1900 includes a compressive spring 1981 that is coupled to the actuator link 1903 (e.g., via a feature 1982) and to the control arm 1944 (e.g., via a feature 1983). For example, a feature such as an opening may be in the actuator link 1903 and a feature such as an opening may be in the control arm 1944 such that one end of the spring 1981 is attached to the actuator link 1903 and another end of the spring 1981 is attached to the control arm 1944. Such a spring may apply an expansive force and/or a compressive force that acts to load various joints in the example assembly 900 of FIG. 9. As an example, the wastegate shaft may be loaded with respect to the bore and/or the bushing; the joint about the peg 1946 may be loaded; the joint about the coupling peg 1963 may be loaded; and the rotational peg 1961 may be loaded with respect to a bore, a bushing, etc. In such an example, a single element (e.g., the spring 1981) can load multiple components. Such loading may act to diminish one or more of noise, wear, leakage, etc.

FIG. 9 also shows various dimensions, including axis to axis dimensions. Such axis to axis dimensions may define at least in part a link length. For example, the assembly 1900 of FIG. 9 includes four axes: an axis of the rotational peg 1961 (e.g., rotatable by the actuator 1901), an axis of the coupling peg 1963, an axis of the peg 1946 and an axis of the shaft as illustrated at the end of the shaft 1953. In such an example, a first link component (see, e.g., 1962), a second link component (see, e.g., 1903) and a third link component (see, e.g., 1944) can be driven by the actuator 1901 to control movement of the shaft that is coupled (e.g., or integral to) the wastegate plug. As mentioned, where such link components (e.g., links) are loaded by the actuator 1901 via the first link component, the load may act to diminish some amount of noise, etc. (e.g., rattling, etc.). However, where an applied load is diminished, one or more of the link components may be susceptible to movement (e.g., due to clearances, etc.). Such movement may cause contacting between surfaces that can generate noise and, for example, wear. Further, as clearances change due to movement, upon actuation, quick movements may occur before "catching", which may incur forceful contacting between surfaces as a component travels what may be an unimpeded clearance distance (e.g., free space) before such contacting occurs. As an example, loading may act to avoid or diminish such forceful contacting. For example, where two components remain in contact, force may be transferred more "smoothly" from one component to another. In such an example, wear and/or noise may be diminished, which may enhance control, controllability, etc.

FIG. 9 also shows various temperatures labelled $T_1$, $T_2$, $T_3$ and $T_4$ where during operation relationships may exist as follows: $T_1 > T_2 > T_3$ and $T_4$. For example, during operation the hottest joint may be associated with the control arm 1944 as attached to the shaft as indicated by the end of the shaft 1953. As mentioned, a biasing element (e.g., a spring, etc.) may be located with respect to two links that form part of a rotary joint where that joint is not the hottest joint. Further, for example, it may not be the coldest joint. As an example, a biasing element may be located at a joint characterized by an intermediate temperature (e.g., between hottest and coldest). As mentioned, such a biasing element may act to load multiple joints (e.g., including at least one hotter joint and at least one colder joint). As an example, a biasing element may be a torque element in that it has an effect on torque as to one or more components (e.g., links) joined at a rotary joint.

Figure 10:
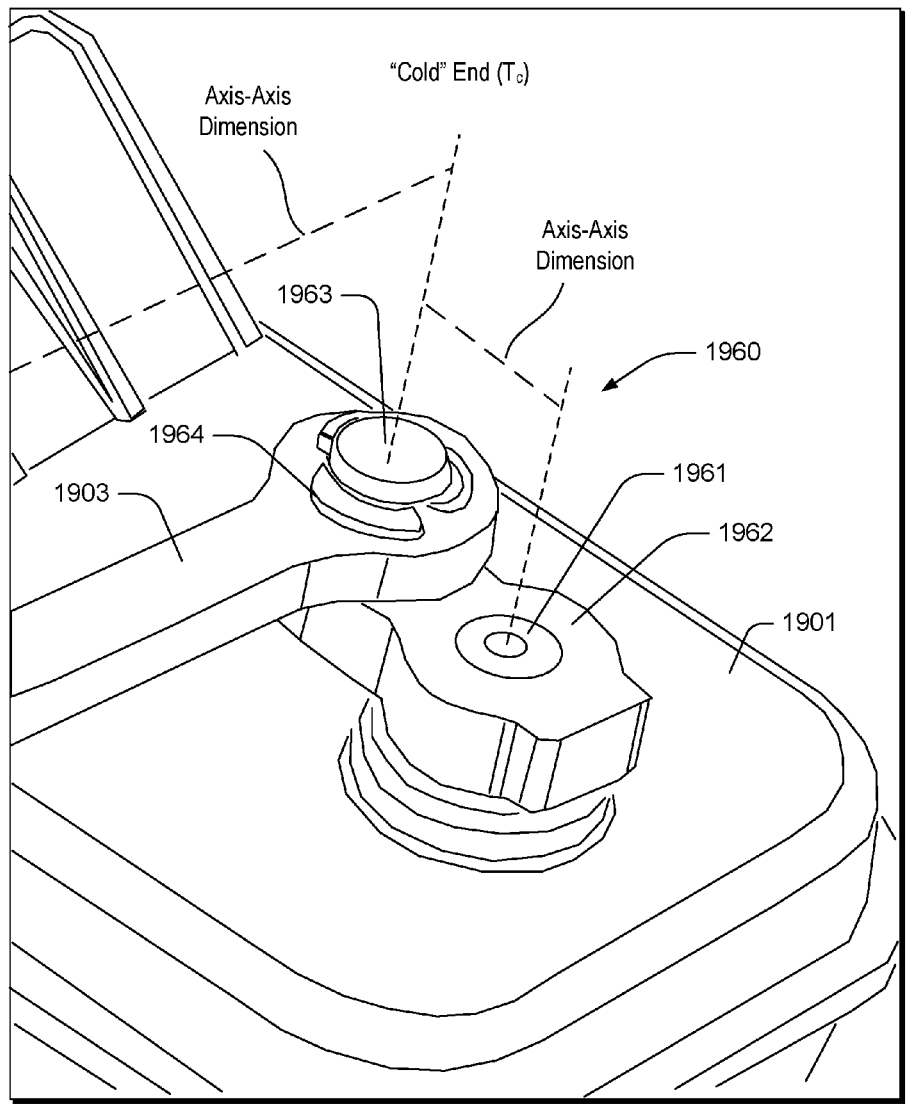
FIG. 10 is a view of a portion of the assembly of FIG. 9.

FIG. 10 is a perspective view of a portion of the assembly 1900 of FIG. 9. The portion shown in FIG. 10 may be considered to be a "cold" end as it may be at a temperature that is less than a "hot" end (e.g., an end proximate to an exhaust turbine). In FIG. 10, one or more portions may be loaded via use of a biasing element such as the spring 1981 of FIG. 9. For example, a spring may be coupled to the coupling arm 1962 causes the actuator link 1903. As an example, a biasing element may be disposed about the coupling peg 1963 and/or disposed about the rotational peg 1961.

Figure 11:
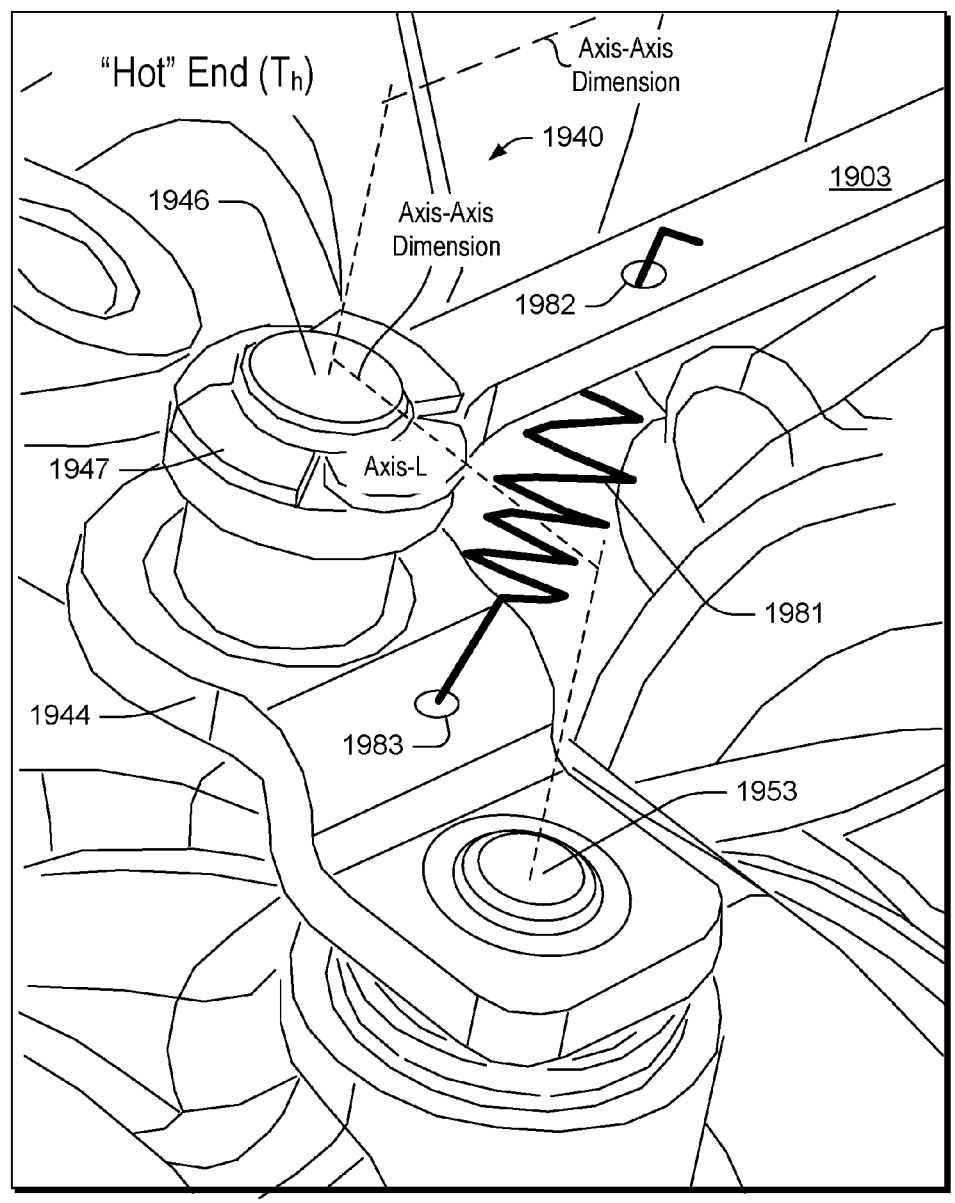
FIG. 11 is a view of a portion of the assembly of FIG. 9.

FIG. 11 is a perspective view of a portion of the assembly 900 of FIG. 9. The portion shown in FIG. 11 may be considered to be a "hot" end as it may be at a temperature that is greater than a "cold" end (e.g., an end proximate to a controller such as the actuator 1901). In FIG. 11, various portions may be loaded via use of a biasing element such as the spring 1981 or another type of biasing element.

Figure 12:
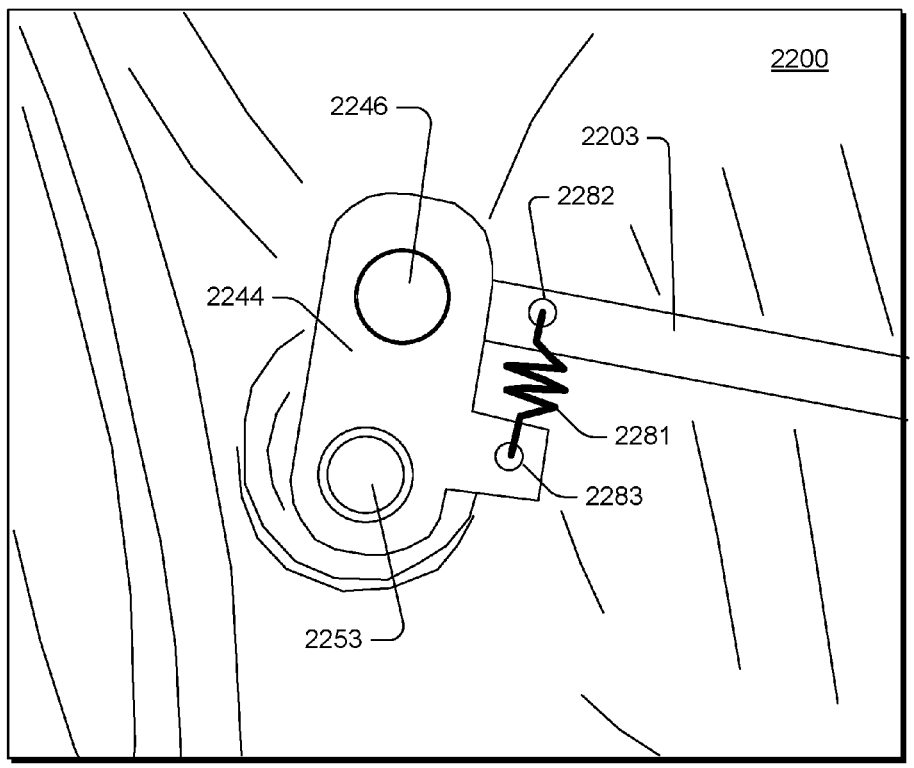
FIG. 12 is a view of a portion of an example of an assembly.

FIG. 12 is a view of an example of a portion of an assembly 2200 that includes an actuator link 2203 (e.g., a control link) and a control arm 2244. In the example of FIG. 12, the actuator link 2203 is coupled at one end to a control linkage (e.g., of a controller) and is coupled at another end to the control arm 2244. In the example of FIG. 12, a control linkage can be a chain of components that includes two portions operatively coupled via the actuator link 2203.

As shown in FIG. 12, a pin 2246 (e.g., a peg, etc.) forms a joint between the actuator link 2203 and the control arm 2244 where the control arm 2244 is attached to a shaft, as indicated by an end of the shaft 2253. In the example of FIG. 12, a biasing element 2281 is coupled to the actuator link 2203 and is coupled to the control arm 2244. In such an example, the control arm 2244 can include an extension that includes a feature or features for coupling of the biasing element 2281. As shown, the extension can include an opening 2283 (e.g., a hole, etc.) and the actuator link 2203 can include an opening 2282 (e.g., a hole, etc.). As an example, one or more other types of coupling features may be utilized for one or more biasing elements (e.g., hooks, recesses, etc.).

As an example, locations of one or more features to couple a biasing element may be selected to, for example, achieve a desired amount of distance between the locations. For example, a location may be selected with respect to another location to achieve a maximum or near maximum amount of distance for a corresponding state of a wastegate plug with respect to a wastegate seat; or, for example, a location may be selected with respect to another location to achieve a minimum or near minimum amount of distance for a corresponding state of a wastegate plug with respect to a wastegate seat. A larger distance may act to stretch a biasing element more than a shorter distance. In the example of FIG. 12, as the actuator link 2203 moves to the right, the control arm 2244 moves in a clockwise direction where the biasing element 2281 can increase in length; whereas, as the actuator link 2203 moves to the left, the control arm 2244 moves in a counter-clockwise direction where the biasing element 2281 can decrease in length. As an example, the amount of an increase and/or a decrease may be determined at least in part by a coupling location of a biasing element (e.g., or coupling locations). In such an example, where force depends on length of a biasing element (e.g., F kx), the amount of force may be determined at least in part by a coupling location of a biasing element (e.g., or coupling locations).

Figure 13:
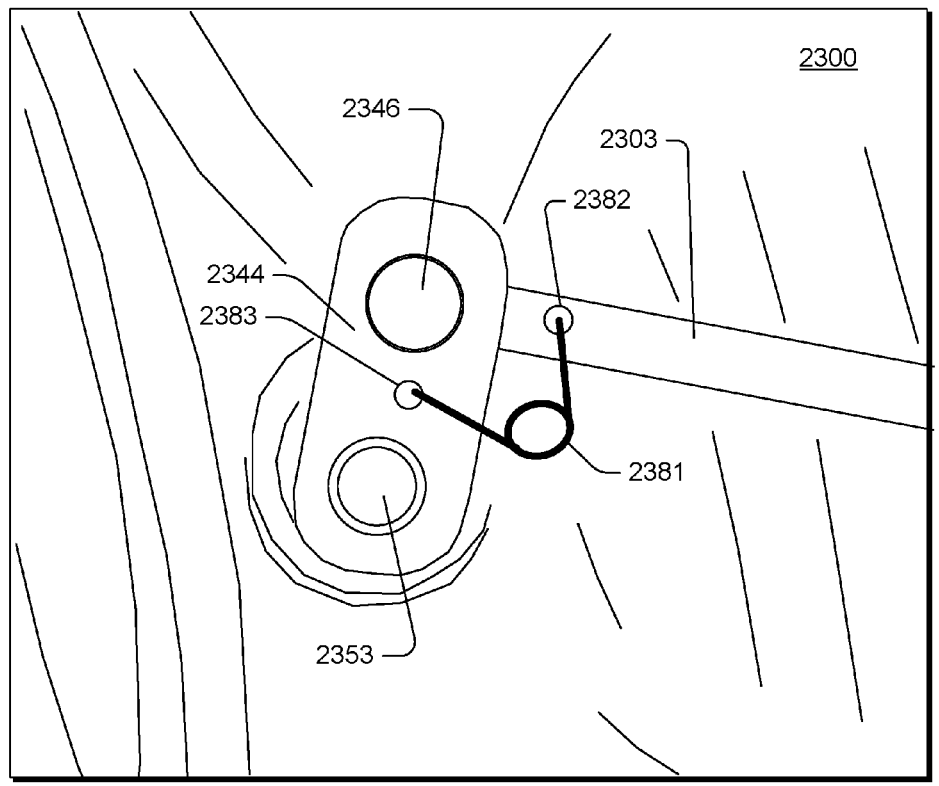
FIG. 13 is a view of a portion of an example of an assembly.

FIG. 13 is a view of a portion of an example of an assembly 2300 that includes an actuator link 2303 (e.g., a control link), a control arm 2344, a pin 2346 (e.g., a peg, etc.), a shaft as indicated by an end of the shaft 2353 and a spring 2381. As an example, the control arm 2344 can include an opening 2383 or other feature to couple the spring 2381 thereto and the actuator link 2303 can include an opening 2382 or other feature to couple the spring 2381 thereto. In the example of FIG. 13, the spring 2381 may be a torsion spring.

Figure 14:
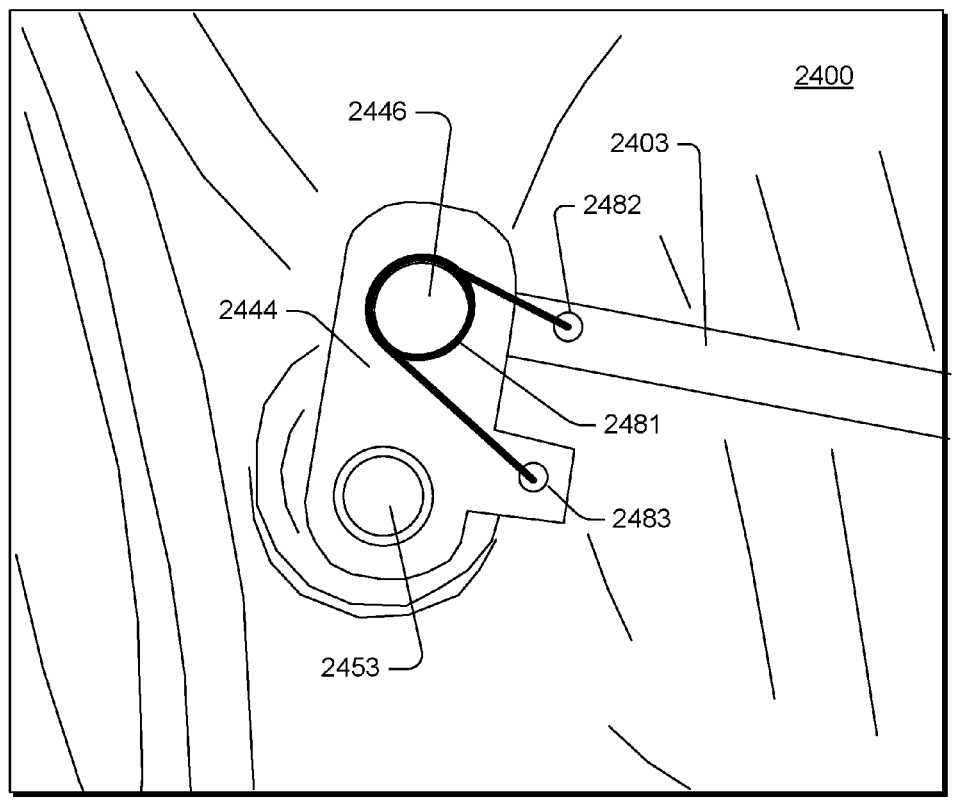
FIG. 14 is a view of a portion of an example of an assembly.

FIG. 14 is a view of a portion of an example of an assembly 2400 that includes an actuator link 2403 (e.g., a control link), a control arm 2444, a pin 2446 (e.g., a peg, etc.), a shaft as indicated by an end of the shaft 2453 and a spring 2481. As an example, the control arm 2444 can include an opening 2483 or other feature to couple the spring 2481 thereto and the actuator link 2403 can include an opening 2482 or other feature to couple the spring 2481 thereto. In the example of FIG. 14, the spring 2481 may be a torsion spring. As an example, the spring 2481 may be a tensile spring or a compressive spring (e.g., ends being forced toward one another or ends being forced apart from one another).

In the example of FIG. 14, the spring 2481 may be fit about the pin 2446, for example, such that the spring 2481 is substantially coaxial with an axis of the pin 2446. For example, the spring 2481 may include one or more turns that form a circle or cylinder.

Figure 15:
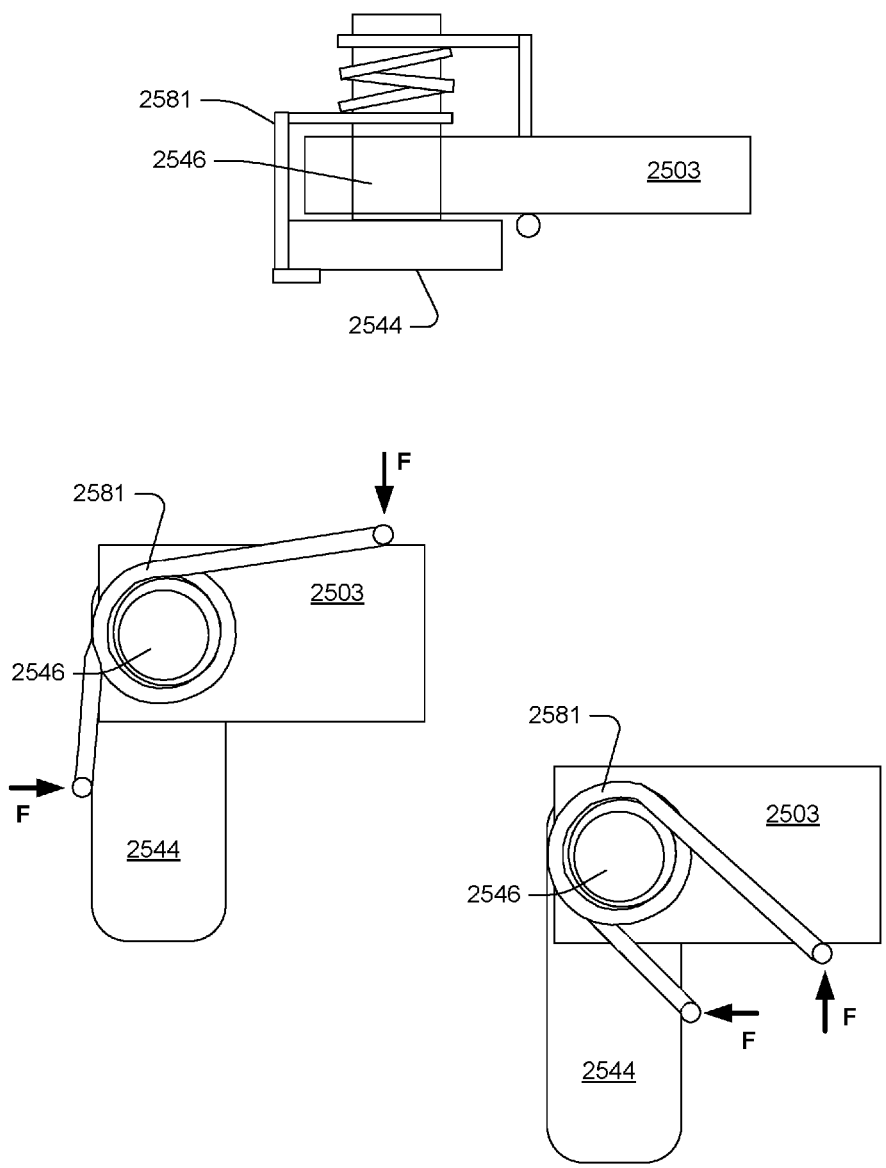
FIG. 15 is a series of views of examples of portions of an assembly.

FIG. 15 is a series of views of examples of portions of an assembly that includes a rod end 2503 (e.g., an end of an actuator link or control link), a crank 2544 (e.g., a control arm), a pin 2546 and a spring 2581 (e.g., a biasing element). As an example, a type of biasing element or types of biasing elements may be selected to achieve a desired amount of loading and/or a desired direction of loading. As an example, a spring may be coupled about a joint to achieve a desired amount of loading and/or a desired direction of loading (see, e.g., arrows in FIG. 15). FIG. 15 shows examples of loading forces that act to "open" an acute angle between the rod end 2503 and the crank 2544 and of loading forces that act to "close" an acute angle between the rod end 2503 and the crank 2544.

Figure 16:
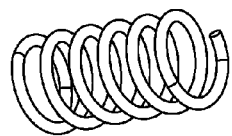
FIG. 16 is a series of views of examples of springs.
Figure 16:
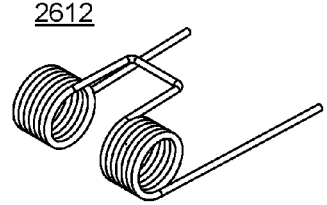
Figure 16:
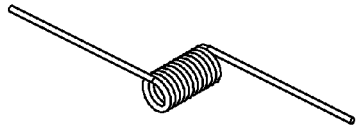
Figure 16:
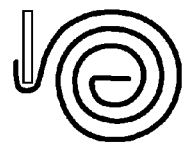

FIG. 16 is a series of views of examples of biasing elements 2610, 2612, 2613 and 2614. As an example, if not twisted beyond an elastic limit, a torsion spring may, for example, obey an angular form of Hooke's law:

$$\tau = -k\theta$$

where $\tau$ is the torque exerted by the spring in newton-meters, and $\theta$ is the angle of twist from its equilibrium position in radians, k is a constant with units of newton-meters/radian, variously called the spring's torsion coefficient, torsion elastic modulus, rate, or spring constant, for example, equal to a change in torque required to twist the spring through an angle of 1 radian. Such an approach can be somewhat analogous to the spring constant of a linear spring. Above, the negative sign indicates that the direction of the torque is opposite to the direction of twist.

As an example, energy U, in joules, stored in a torsion spring may be estimated via an equation such as, for example:

$$U = \frac{1}{2}k\theta^2$$

As an example, a torsion spring may operate by torsion or twisting; that is, a flexible elastic object that stores mechanical energy when it is twisted. When it is twisted, it exerts force (torque) in the opposite direction, which may be proportional to the amount (angle) it is twisted. As an example, a torsion bar may be a straight bar of metal or rubber that is subjected to twisting (shear stress) about its axis by torque applied at its ends. As an example, a helical torsion spring may be a metal rod, wire, etc., in the shape of a helix (e.g., a coil) that is subjected to twisting about the axis of the coil by sideways forces (bending moments) applied to its ends, twisting the coil tighter. In a helical torsion spring, forces acting on the rod, wire, etc., can be characterized as bending stresses (e.g., rather than torsional (shear) stresses).

As an example, a biasing element may be referred to as a spring. As an example, some types of springs include at least one coil (e.g., at least one loop) that exists between two ends. As an example, one or more ends may be shaped, for example, to provide for coupling to an object. As an example, a biasing element may include multiple coils such as the example biasing element 2612 of FIG. 16, where a portion between two coils may be shaped to couple to an object. As an example, another portion may be included to couple to another object. As an example, a coil or coils may optionally be fit over a shaft, post, a peg, a pin, etc.

As an example, the biasing element 2614 of FIG. 16 may be a spiral torsion spring made of flat material and may be characterized in that coils generally do not touch during operation. As an example, a spiral torsion spring can exert a rotational torque (e.g., through 360 degrees of rotation or less). As an example, a torque curve of a spiral torsion spring may be linear to the degree of rotation. As an example, an inner end of a spring may be bent to attach to an arbor or hub and an outer end may be attached or in contact with an object that is rotating or utilizing the torque of the spring. As an example, the biasing element 2614 may be fit to a pin, a peg, etc. As an example, an assembly may include two biasing elements such as the biasing element 2614 fit to a pin, a peg, etc., for example, offset with respect to their axial positions where, for example, one contacts one link and the other contacts another link where the links are joined at least in part via the pin, the peg, etc. As an example, a pin, a peg, etc. may be fixed to a link such that rotation of the link rotates the pin, the peg, etc. In such an example, a biasing element 2614 may be in contact with the link via the pin, the peg, etc. and may be in contact with another link (e.g., via an outer end of the biasing element 2614).

Figure 17:
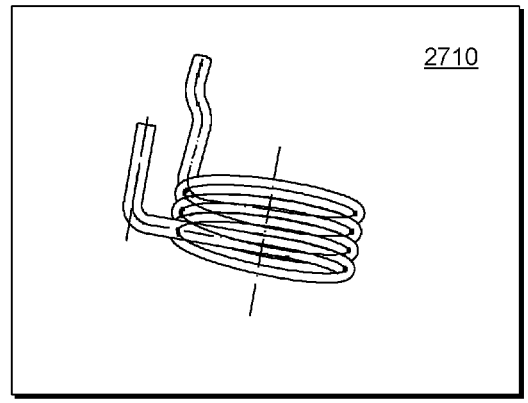
FIG. 17 is a series of views of an example of a spring.
Figure 17:
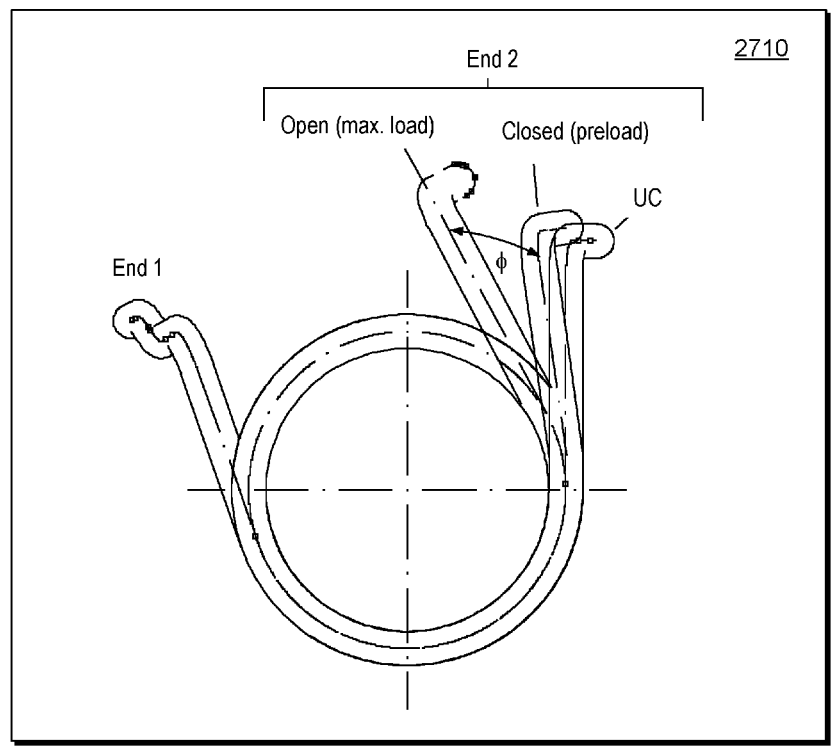

FIG. 17 shows an example of a biasing element 2710 that can be a spring with two ends (end 1 and end 2). As shown, one of the ends can be movable from an uncompressed state (e.g., free standing state) to a preloaded state that corresponds to a closed state of a valve (e.g., a wastegate valve) and movable to another state that applies an increased load (e.g., greater than the preload of the preloaded state) that corresponds to an open state of the valve (e.g., a wastegate valve).

Figure 18:
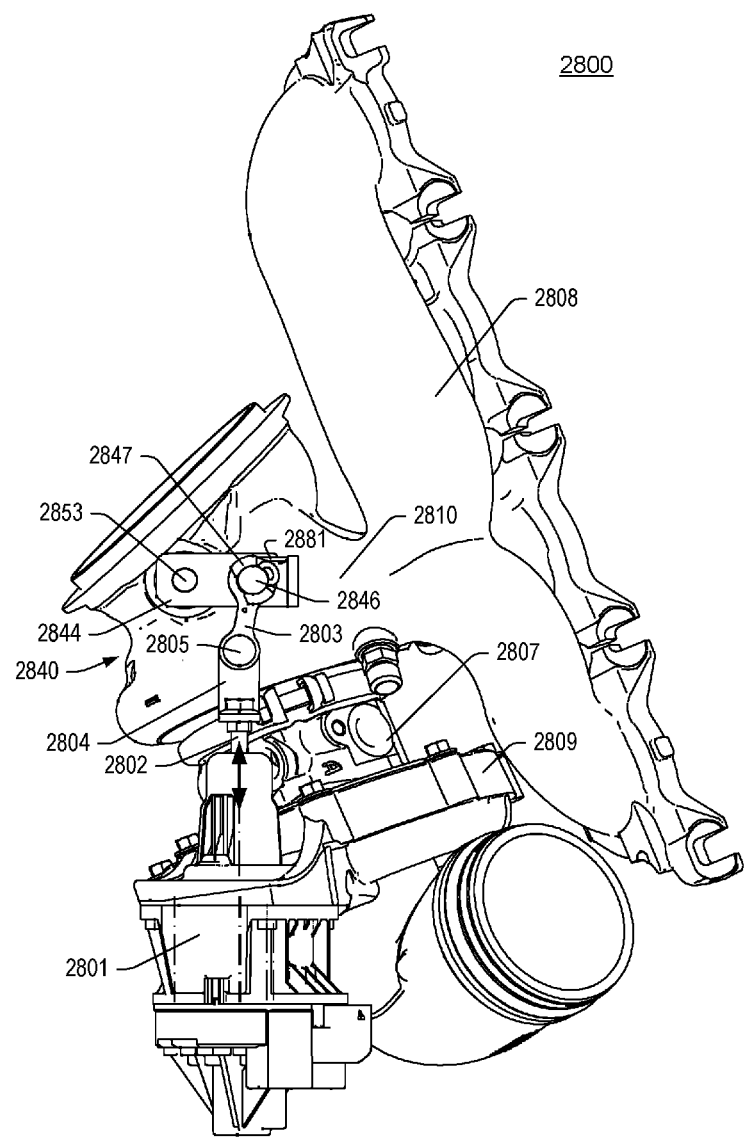
FIG. 18 is a view of an example of an assembly.

FIG. 18 shows an example of an assembly 2800 that includes a linear actuator 2801 (see, e.g., arrows) that includes a translatable actuator rod 2802 that is operatively coupled to a link 2804 that couples to an actuator link 2803 (e.g., a control link) via a joint 2805 (e.g., an axle, a pin, etc.). As shown, the assembly 2800 includes a center housing 2807, a manifold 2808, a compressor housing 2809 and a turbine housing 2810, which may be integral to or operatively coupled to the manifold 2808.

As shown in the example of FIG. 18, the actuator link 2803 is operatively coupled to a valve control linkage 2840 that includes a control arm 2844 and a peg 2846 that may be secured via a retainer 2847 (e.g., a C-clip, etc.). As shown, the actuator link 2803 is operatively coupled to the control arm 2844 via the peg 2846 and the control arm 2844 is operatively coupled to a wastegate shaft 2853 such that pivoting of the control arm 2844 (e.g., via actuation of the actuator 2801) about an axis of the wastegate shaft 2853 causes the wastegate shaft 2853 to rotate and control the position of a plug (e.g., of a wastegate arm and plug component or subassembly) where the plug may and/or an arm and plug may be optionally integral to the wastegate shaft 2853 (e.g., a unitary component formed of a single piece of material).

In the example of FIG. 18, a biasing element 2881 is disposed about the peg 2846 and can applying biasing force with respect to the actuator link 2803 and the control arm 2844.

Figure 19:
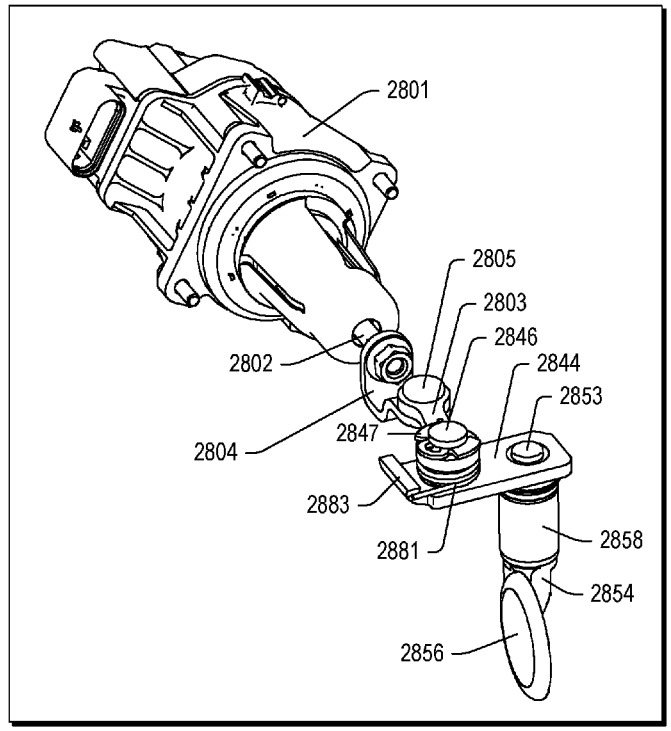
FIG. 19 is a series of views of examples of assemblies.
Figure 19:
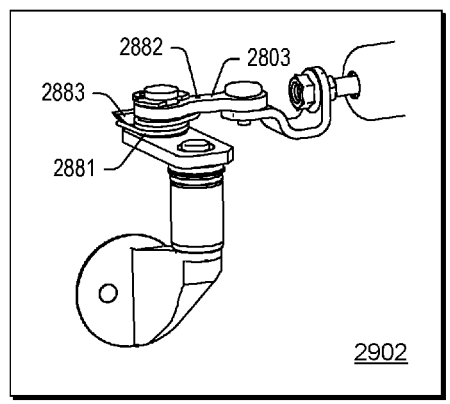
Figure 19:
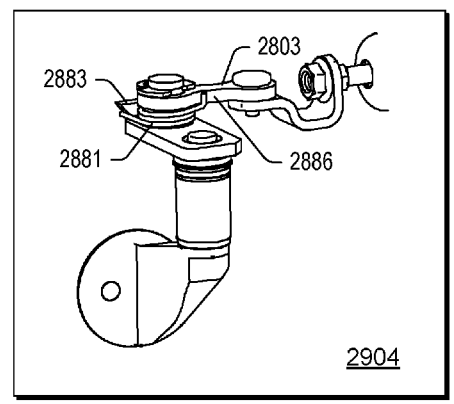

FIG. 19 shows a portion of the assembly 2800 of FIG. 18 where an arm 2854 extends from the wastegate shaft 2853 and where a plug 2856 extends from the arm 2854. As shown, a bushing 2858 may be disposed about at least a portion of the wastegate shaft 2853. Such a bushing may sit at least in part in a bore of a housing where the bushing may provide for centering and/or to hinder flow of exhaust, for example, from a chamber to an exterior space.

FIG. 19 shows two example arrangements 2902 and 2904 with respect to the biasing element 2881. As shown in the arrangement 2902, the actuator link 2803 (e.g., a control link) can include an opening 2882 and the control arm 2844 can include a feature 2883 that can allow for sliding movement of a portion of the biasing element 2881 (e.g., a straight length, etc.) against the feature 2883. In the example arrangement 2904, the actuator link 2803 can include a surface 2886 that can be utilized to contact (e.g., accept force) from the biasing element 2881.

As an example, the opening 2882 may be a closed opening or may be an opening that is a slotted opening where a slot extends to a side of the actuator link 2803. As an example, a biasing element can include a straight portion that may extend into and optionally through an opening such as the opening 2882. As an example, the opening 2882 may be a bore that extends from one side of the actuator link 2803 to another side of the actuator link 2803. As an example, an actuator link may be fit with a connector that is welded, interference fit, etc. to the actuator link where the connector allows for coupling of a biasing element. For example, an actuator link may include an aperture where an end of a hook may be interference fit and/or welded into the aperture such that a portion of the hook extends away from the actuator link and can connect to a biasing element.

In the example of FIG. 19, the linear actuator 2801 can cause translational movement of the actuator rod 2802, which causes the link 2804 to move whereby the link 2804 can be fixed to the actuator link 2803 to cause the control arm 2844 to move and rotate the wastegate shaft 2853. As shown in the example of FIG. 19, the biasing element 2881 can apply a biasing force to the actuator link 2803 and the control arm 2844. As an example, the biasing element 2881 can be a biasing element such as, for example, the biasing element 2710 of FIG. 17.

Figure 20:
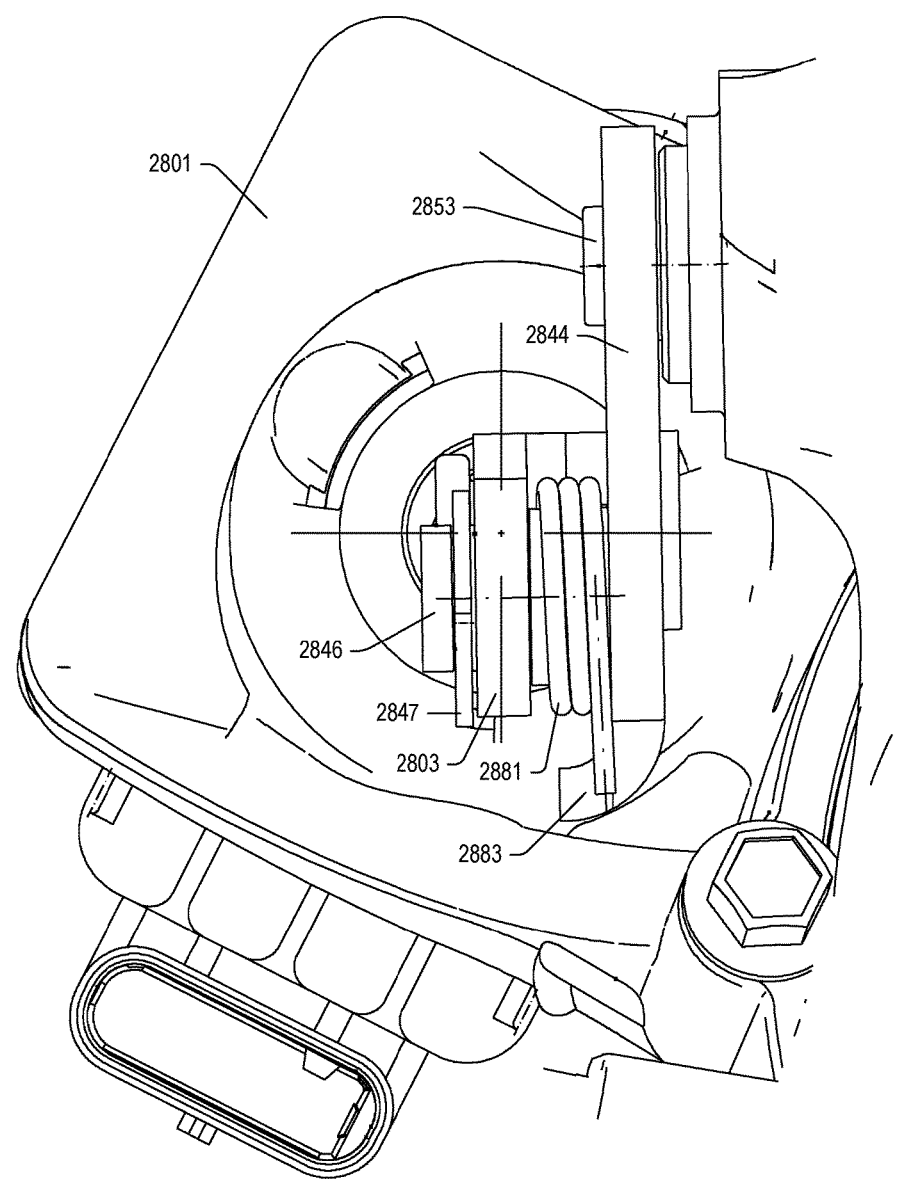
FIG. 20 is a view of a portion of an example of an assembly.

FIG. 20 shows another view of a portion of the assembly 2800 of FIG. 18. In FIG. 20, the feature 2883 of the control arm 2844 is shown as being an end feature with a curve. As shown, a straight portion of the biasing element 2881 can contact the feature 2883. As an example, during operation of the assembly 2800, the straight portion of the biasing element 2881 may slide against the feature 2883. As shown in FIG. 20, the biasing element 2881 can include one or more coils disposed about the peg 2846 where one end of the biasing element 2881 is associated with the control arm 2844 and another end of the biasing element 2881 is associated with the actuator link 2803. In such an example, the biasing element 2881 may be in a state that is a loaded state for the plug 2856 in a closed orientation with respect to a passage and the biasing element 2881 may be in another state that is a loaded state with a different load for the plug 2856 in an open orientation with respect to the passage.

Figure 21:
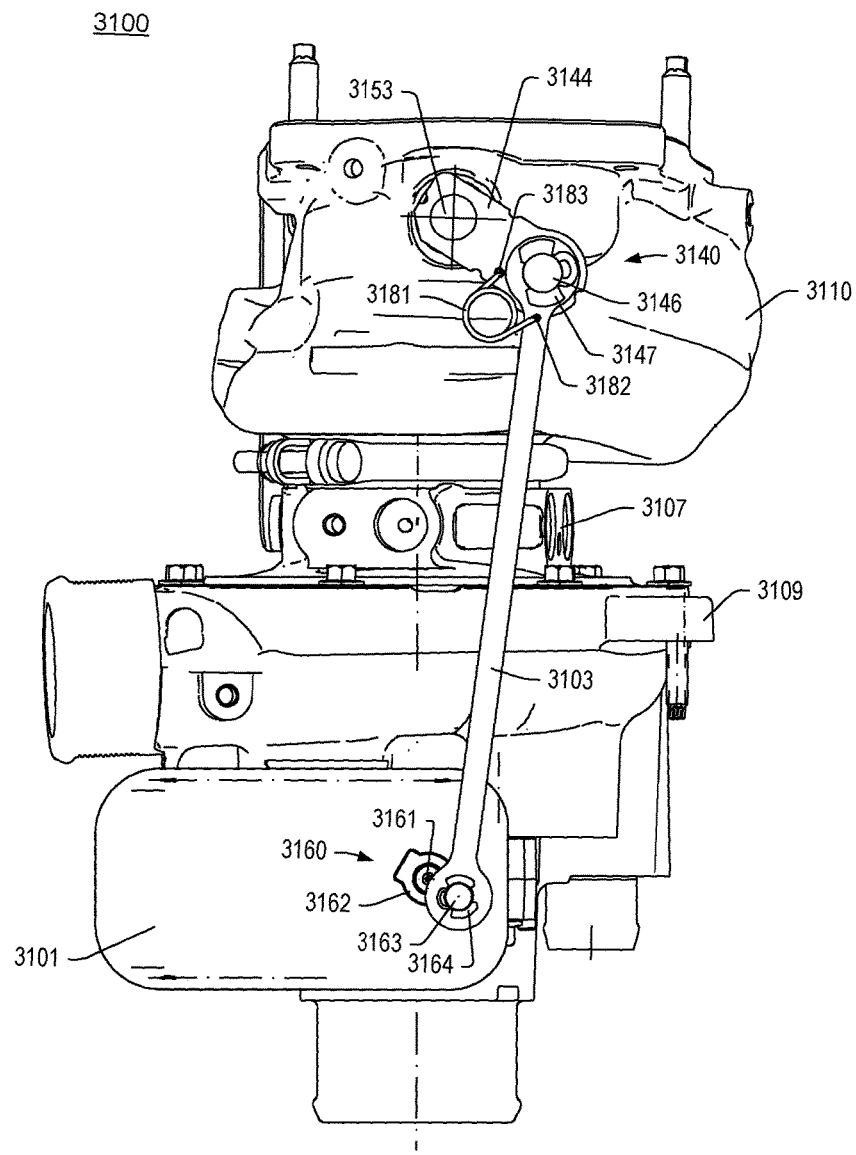
FIG. 21 is a view of an example of an assembly.

FIG. 21 shows an example of an assembly 3100 that includes an actuator 3101, an actuator link 3103 (e.g., a control link), a center housing 3107, a compressor housing 3109 and a turbine housing 3110. In the example of FIG. 21, the actuator 3101 may be mounted to the compressor housing 3109. As shown, the actuator link 3103 is operatively coupled to a sub-assembly 3140 associated with the turbine housing 3110 and to a sub-assembly 3160 associated with the actuator 3101.

As an example, the actuator 3101 may be a rotary actuator, for example, for moving one or more coupling components. For example, consider a rotational peg 3161 (e.g., a pin, a shaft, etc.) that can be rotated by the actuator 3101 via electrical power supplied to the actuator 3101. In such an example, the rotational peg 3161 may be a shaft of an electric motor or may be a shaft coupled to a shaft of an electric motor (e.g., via one or more gears, couplings, etc.). As shown, a coupling arm 3162 can be fit to the rotational peg 3161 such that rotation thereof causes the coupling arm 3162 to rotate in a clockwise or counter-clockwise direction (e.g., by a number of degrees as may be measured about an axis of the rotational peg 3161). As shown, a coupling peg 3163 (e.g., a pin) is coupled to an actuator link 3103 and to the coupling arm 3162. In such an example, rotation of the coupling arm 3162 causes the actuator link 3103 to move, for example, either toward the turbine housing 3110 or away from the turbine housing 3110 (e.g., depending on a desired state of the wastegate plug with respect to the wastegate seat). Such movement can thereby cause a control arm 3144 to rotate as it is coupled to the actuator link 3103 via a peg 3146 (e.g., a pin) and optionally secured via a clip 3147 or other suitable component. Further, as the control arm 3144 is attached to a wastegate shaft at or proximate to the end of the wastegate shaft 3153, movement of the control arm 3144 in a clockwise or counter-clockwise direction can cause a wastegate arm and plug, as coupled to the wastegate shaft or integral to the wastegate shaft, to move.

In the example of FIG. 21, a biasing element 3181 is operatively coupled to the actuator link 3103 and to the control arm 3144 and can applying biasing force with respect to the actuator link 3103 and the control arm 3144. In the example of FIG. 21, the actuator link 3103 includes a feature 3182 that can couple to the biasing element 3181 and the control arm 3144 includes a feature 3183 that can couple to the biasing element 3181. For example, the features 3182 and 3183 may be the same type of feature or may differ (e.g., consider one or more of holes, openings, hooks, recesses, etc.).

Figure 22:
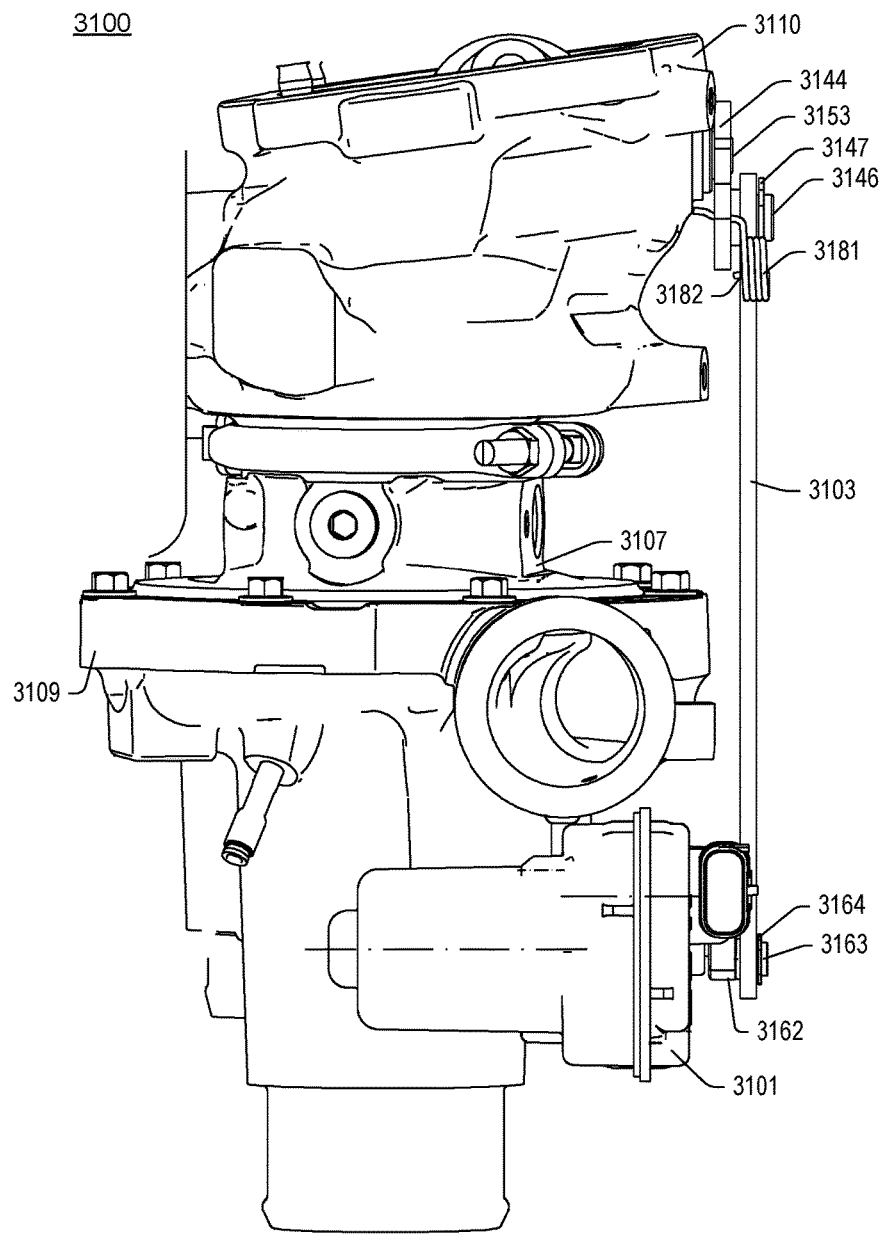
FIG. 22 is another view of the example of the assembly of FIG. 22.

FIG. 22 shows another view of the assembly 3100 of FIG. 21. As shown, the biasing element 3181 includes an end portion that cooperates with the feature 3182 of the actuator link 3103. Referring again to FIG. 21, the biasing element can include a loop where the loop is offset from an axis of the peg 3146. As an example, such an arrangement may be referred to as an external arrangement while a loop disposed about a peg may be referred to as an internal arrangement. As an example, for purposes of replacement and/or inspection, an external arrangement may be utilized. As an example, an external arrangement may experience lesser wear when compared to an internal arrangement as in an internal arrangement a peg may contact a surface of a loop.

As an example, an assembly may include an internal biasing element and an external biasing element. As an example, an internal biasing element may be a primary biasing element and an external biasing element may be a secondary biasing element that can optionally be replaced, serviced, etc., for example, depending on one or more behaviors that may occur during operation. As an example, consider an assembly that after some period of service reaches a level of noise where a biasing element may be replaced, serviced, etc., in an effort to reduce the level of noise. In such an example, the biasing element may be selected from a variety of biasing elements to tailor application of force to address one or more issues (e.g., noise, wear, leakage, etc.).

Figure 23:
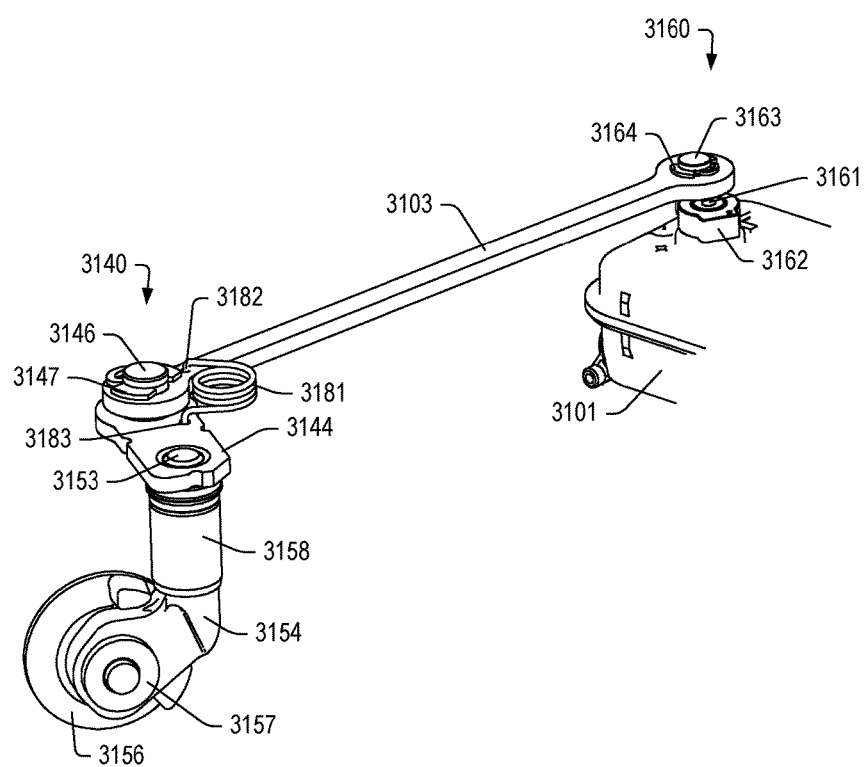
FIG. 23 is a view of an example of an assembly.

FIG. 23 shows a portion of the assembly 3100 of FIGS. 21 and 22 where an arm 3154 extends from the wastegate shaft 3153 and where a plug 3156 extends from the arm 3154. As an example, the arm 3154 can be operatively coupled to the plug 3156, optionally secured via a press-fit washer 3157 (e.g., or another type of mechanism, component, etc.). As an example, the wastegate shaft 3153, the arm 3154 and the plug 3156 may be one or more components (e.g., integral or a sub-assembly). As shown, a bushing 3158 may be disposed about at least a portion of the wastegate shaft 3153. Such a bushing may sit at least in part in a bore of a housing where the bushing may provide for centering and/or to hinder flow of exhaust, for example, from a chamber to an exterior space.

Figure 24:
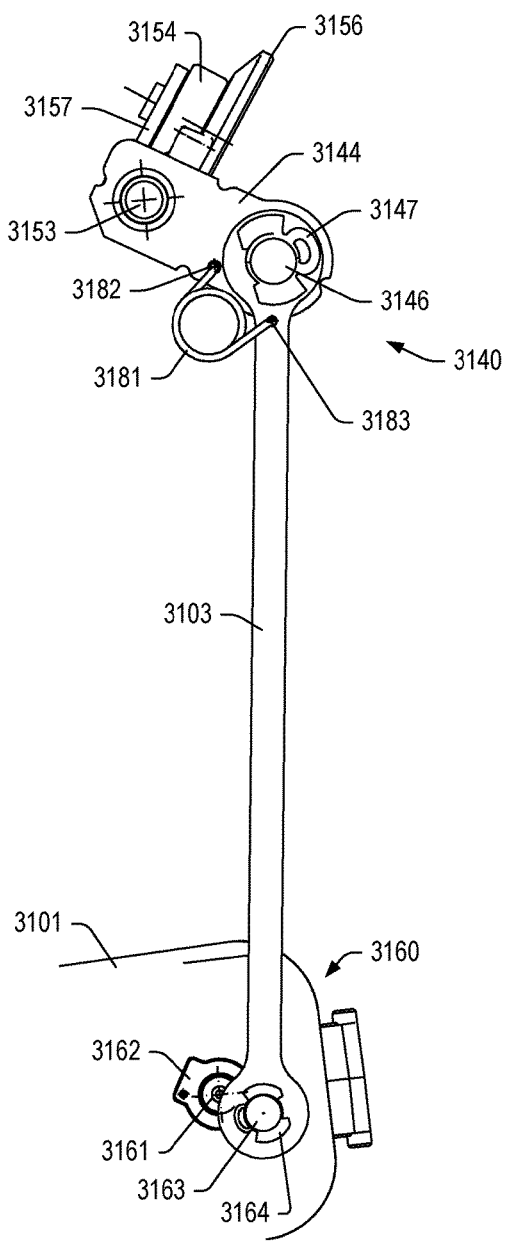
FIG. 24 is another view of the example of the assembly in FIG. 23.

FIG. 24 shows another view of the portion of the assembly 3100 of FIGS. 21 and 22. As shown, the actuator link 3103 spans a distance between the sub-assembly 3140 and the sub-assembly 3160. As mentioned, operational temperatures may differ between the sub-assemblies 3140 and 3160. As shown, the biasing element 3181 may be utilized in the sub-assembly 3140, which may be considered a hot end when compared to the sub-assembly 3160.

As an example, various parameters and equations may be used to select a biasing element, etc. As an example, a spring can include a round wire, a square wire, a rectangular wire, etc.

As an example, an assembly can include an "intra-linkage" biasing mechanism, for example, for preloading multiple joints of wastegate kinematics components by one flexible element (e.g., one biasing element).

As an example, a biasing element may act substantially as to impact torque, for example, without having a substantial impact on force or forces axially along a direction or directions of a pivot axis defined by a pin, a peg, a shaft, etc. For example, a torsion spring may be effectively "neutral" as to axial force along an axis of a pin, a peg, a shaft, etc. where two links can pivot with respect to each other about that axis. As an example, a biasing element may act in part to secure a link or links at a joint, optionally in a relatively force "neutral" manner as to axial forces defined along axial directions of an axis of the joint. Such a biasing element may act to impact torque, rotation about the axis of the joint. As an example, an assembly can include a biasing element that is not neutral as to torque and that is neutral as to axially directed force or forces.

As an example, a biasing element at a wastegate control arm and rod may also bias/preload a joint at the other end of the rod and may also bias/preload the control arm to wastegate shaft joint. Thus, an appropriately positioned single biasing element may preload multiple joints.

As an example, a biasing element, which may be a spring, can allow for an increase radial clearance(s) and/or axial clearance(s) in one or more cylindrical joints. In such an example, a tolerance band of a control mechanism may be increased where, for example, such a mechanism can accept more parasitic deflections. In such an example, production may be economized and/or field replacement, etc., facilitated. As movement of one or more components can be associated with one or more clearances, an increase in one or more clearances may offer opportunity for an increase in noise. As an example, one or more biasing elements can be included in an assembly to "control" one or more clearances via bias force(s). In such an example, a biasing element can help to reduce noise (e.g., vibration noise, rattling, etc.) during operation of an assembly, an internal combustion engine, a vehicle, etc. As an example, a biasing element may be part of a silencing approach of an assembly that may include increased clearance or clearances between one or more components (e.g., tolerances, etc.). As an example, one or more biasing mechanisms may act to firm-up a shaft of a wastegate valve, especially where the valve is in an open position. In such an example, the firming-up may act to reduce rattling, noise, exhaust leakage, etc.

As an example, an assembly may include clearances between parts in kinematics where, for example, the parts are operatively coupled to an actuator, a control linkage, etc. of a turbocharger. For example, a turbocharger assembly may include an electric actuator that actuates a rigid linkage component that is operatively coupled to one or more other components. As an example, one or more clearances may be provided for purposes of accommodating one or more misalignments that may stem from manufacturing of a component or components, thermal distortion, etc. One or more clearances may allow for movement that may lead to noise, wear, etc. As an example, one or more biasing mechanisms may be included in a turbocharger assembly that act to eliminate and/or damp movement (e.g., vibration damping, etc.). As an example, one or more biasing mechanisms may provide for "zero clearance" kinematics at one or more interfaces between components.

As an example, an assembly may include a spring (e.g., a coil spring, etc.) positioned outboard of a kinematics control system. In such an example, the coil spring may reduce axial and/or radial clearances in along a kinematic chain, for example, optionally with little to no effect on actuator calibration or in a manner that may be accounted for in actuator calibration. As an example, a spring may have a relatively constant stiffness (e.g., application of force) over a range of motion of an actuator rotational pin, etc., with respect to a control link.

As an example, an assembly may include multiple biasing features. As an example, an assembly may include multiple springs. In such an example, a control rod or a control link may include features for coupling one or more springs to the control rod or the control link, for example, to exert a biasing force to the control rod or the control link that acts to move a shaft operatively coupled to a wastegate plug, optionally in a manner where the biasing force varies depending on the position of the control rod or the control link (e.g., consider an axial position, as controlled via an actuator). As an example, in a cylindrical coordinate system with a z-axis defined along a control axis of a control rod or a control link, one or more springs may be operatively coupled to the control rod or the control link where such one or more springs extend at an angle (e.g., or angles). In such an example, the one or more springs may act to shift the z-axis in space, for example, in a manner that acts to move a shaft (e.g., in at least an axial direction along an axis of the shaft) that is operatively coupled to the control rod or the control link (e.g., via a control arm, etc.). In such an example, a shift may depend on position of the control rod or the control link as controlled by an actuator (e.g., for opening or closing a wastegate valve).

An assembly can include a turbine housing that includes a bore, a wastegate seat and a wastegate passage that extends to the wastegate seat; a bushing disposed at least in part in the bore; a rotatable wastegate shaft received at least in part by the bushing; a wastegate plug that extends from the wastegate shaft; a control arm operatively coupled to the wastegate shaft; a control link operatively coupled to the control arm; and a biasing element coupled to the control arm and to the control link. In such an example, the assembly can include an actuator operatively coupled to the control link.

As an example, an assembly can include a pin where a control link is operatively coupled to a control arm via the pin (e.g., which may be a peg, etc.). In such an example, the pin can form a joint between the control arm and the control link. As an example, a biasing element can include a coil that is disposed at least in part about a portion of a pin (e.g., a peg, etc.). As an example, a pin can define an axis, for example, where a control arm and a control link pivot about the axis.

As an example, a biasing element can apply a compressive force to a control arm and a control link. As an example, a biasing element can apply a tensile force to a control arm and a control link. As an example, a biasing element can apply positive or negative (e.g. clockwise or counterclockwise) torque between a control arm and a control link.

As an example, a biasing element may provide an assistance force that can assist an actuator in closing and/or maintain a valve in a closed orientation (e.g., against an aerodynamic load, etc.). For example, a biasing element may assist force exerted by an actuator against exhaust pressure, which may be pulsating. Exhaust pressure may pulsate due to combustion in cylinders of an internal combustion engine where such pulsations may be particularly noticeable where a turbine housing is part of a manifold that receives exhaust from a plurality of cylinders. As an example, exhaust pulsations may be dependent on one or more factors associated with operation of an internal combustion engine. For example, consider revolutions per minute (rpm) where pulsations may increase in frequency as engine rpm increases (e.g., and vice versa). As an example, an internal combustion engine may include more than one turbocharger where each turbocharger may receive exhaust from all cylinders of the internal combustion engine or fewer than all cylinders of the internal combustion engine. As an example, exhaust pulsations may depend on an arrangement of one or more turbochargers with respect to one or more cylinders (e.g., as coupled via one or more manifolds and/or one or more other types of conduits).

As an example, an axis of a control arm (e.g., a long axis) and an axis of a control link (e.g., a long axis) may form an acute angle. As an example, biasing element applies force that acts to increase the acute angle. As an example, a biasing element may apply force that acts to decrease the acute angle.

As an example, an actuator can be a rotary actuator that includes a rotational pin having an axis of rotation. In such an example, a coupling arm can be attached to the rotational pin. In such an example, a coupling pin can be included that defines an axis and that couples the coupling arm to the control link. In such an example, a biasing element, coupled to the control link and a control arm (e.g., at an opposing end of the control link) may apply force to a joint formed by the coupling pin, the coupling arm and the control link. For example, such a biasing element may load multiple joints.

As an example, a biasing element can be or include a spring (e.g., or springs). As an example, a biasing element can include a coil or coils. As an example, a biasing element can be or include a torsion spring.

As an example, a turbocharger can include a compressor assembly; a center housing assembly; a turbine assembly that includes a control arm that controls position of a wastegate plug with respect to a wastegate seat; a control link operatively coupled to the control arm; an actuator operatively coupled to the control link (e.g., via a coupling arm); and a biasing element coupled to the control arm and to the control link.

As an example, a method can include actuating an actuator to adjust a position of a wastegate plug with respect to a wastegate seat where actuating includes moving a control link coupled to a control arm that can be attached to a shaft of a wastegate. In such an example, a biasing element coupled to the control link and the control arm can act to apply a load, for example, where the actuator (e.g., an electric motor of the actuator) may be in a "rest" state in that it does not apply a substantial load or a load to the control link (e.g., directly or indirectly). As an example, a load applied by a biasing element can act to reduce noise, wear, etc., as to one or more joints in a linkage that couples an actuator to a wastegate. Such a linkage can include, for example, two joints of a control link and, for example, a shaft joint and a rotational pin joint where each of the joints may be defined at least in part by a respective axis (e.g., a pivot axis or a rotational axis). As an example, a rotational pin of an actuator can define a rotational axis, a shaft of a wastegate can define a rotational axis, a pin of a joint can define a pivot axis (e.g., for pivoting of a control arm and control link) and another pin of another joint can define a pivot axis (e.g., for pivoting of a control link and a coupling arm).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
  a turbine housing that comprises a bore, a wastegate seat and a wastegate passage that extends to the wastegate seat;
  a bushing disposed at least in part in the bore;
  a rotatable wastegate shaft received at least in part by the bushing;
  a wastegate plug that extends from the wastegate shaft;
  a control arm operatively coupled to the wastegate shaft;
  a control link operatively coupled to the control arm via a pin received by an opening that forms a joint between the control arm and the control link, wherein the joint comprises a clearance that is defined between a radial surface of the pin and an opening wall of the opening;
  an actuator operatively coupled to the control link to transition the wastegate plug between a closed state and an open state; and
  a spring, coupled to the control arm and to the control link, that applies force to the joint that establishes radial contact between the radial surface of the pin and the opening wall and that maintains radial contact through an increase in applied force during transition of the wastegate plug from the closed state to the open state.

2. The assembly of claim 1 wherein the spring comprises a coil that is disposed at least in part about a portion of the pin.

3. The assembly of claim 1 wherein the pin defines an axis and wherein the control arm and the control link pivot about the axis.

4. The assembly of claim 1 wherein the spring applies compressive force to the control arm and the control link.

5. The assembly of claim 1 wherein the spring applies tensile force to the control arm and the control link.

6. The assembly of claim 1 wherein the spring applies torque to the control arm and the control link.

7. The assembly of claim 1 wherein the spring comprises a torsion spring.

8. The assembly of claim 1 wherein the spring comprises a leg in contact with the control arm and a leg in contact with the control link.

9. The assembly of claim 1 wherein an axis of the control arm and an axis of the control link form an acute angle.

10. The assembly of claim 9 wherein the spring applies force that acts to increase the acute angle.

11. The assembly of claim 9 wherein the spring applies force that acts to decrease the acute angle.

12. The assembly of claim 1 wherein the actuator comprises a rotary actuator that comprises a rotational pin having an axis of rotation.

13. The assembly of claim 12 comprising a coupling arm attached to the rotational pin.

14. The assembly of claim 13 comprising a coupling pin that defines an axis and that couples the coupling arm to the control link.

15. The assembly of claim 14 wherein the spring applies force to a joint formed by the coupling pin, the coupling arm and the control link.

16. The assembly of claim 1 wherein the spring comprises a coil.

17. The assembly of claim 16 wherein the coil comprises an axis that is offset from an axis of the pin.

18. A turbocharger comprising:
  a compressor assembly;
  a center housing assembly;
  a turbine assembly that comprises a control arm that controls position of a wastegate plug with respect to a wastegate seat;
  a control link operatively coupled to the control arm via a pin received by a bore that forms a joint between the control arm and the control link, wherein the joint comprises a clearance that is defined between a radial surface of the pin and a bore wall of the bore;
  an actuator operatively coupled to the control link to transition the wastegate plug between a closed state and an open state; and
  a spring, coupled to the control arm and to the control link, that applies force to the joint that establishes radial contact between the radial surface of the pin and the bore wall and that maintains radial contact through an increase in applied force during transition of the wastegate plug from the closed state to the open state.

19. The turbocharger of claim 18 wherein the spring comprises a coil that comprises an axis that is offset from an axis of the pin.

20. The turbocharger of claim 18 wherein the spring comprises a leg that contacts the control arm and a leg that contacts the control link.

* * * * *